Nov. 28, 1961  F. R. SWANSON ET AL  3,010,348
LATHES
Filed March 17, 1955  14 Sheets-Sheet 2
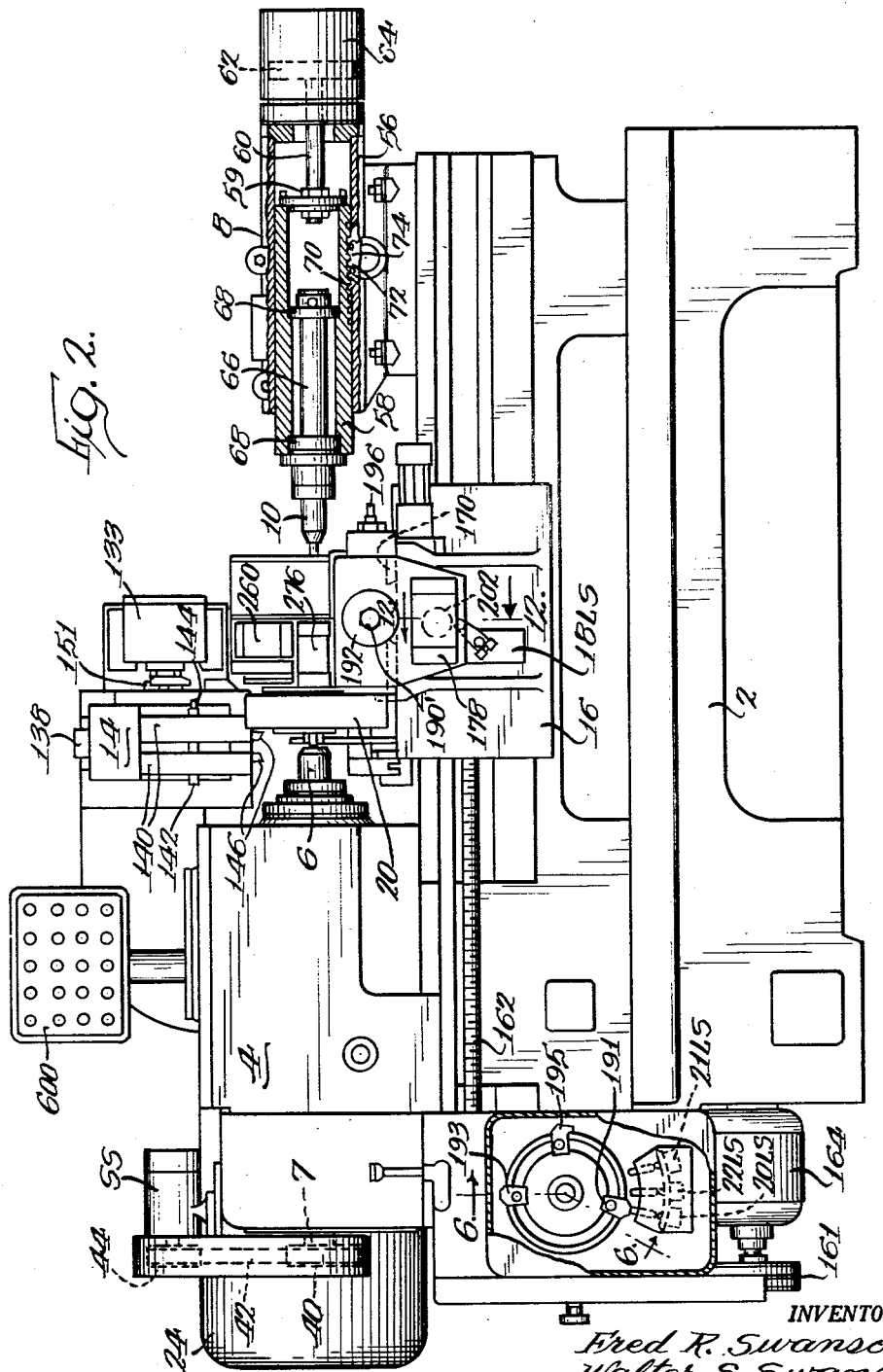
INVENTORS.
Fred R. Swanson
Walter S. Swanson
Gordon L. Nordstrom
By Schroeder, Hofgren, Brady & Wegner
Attys.

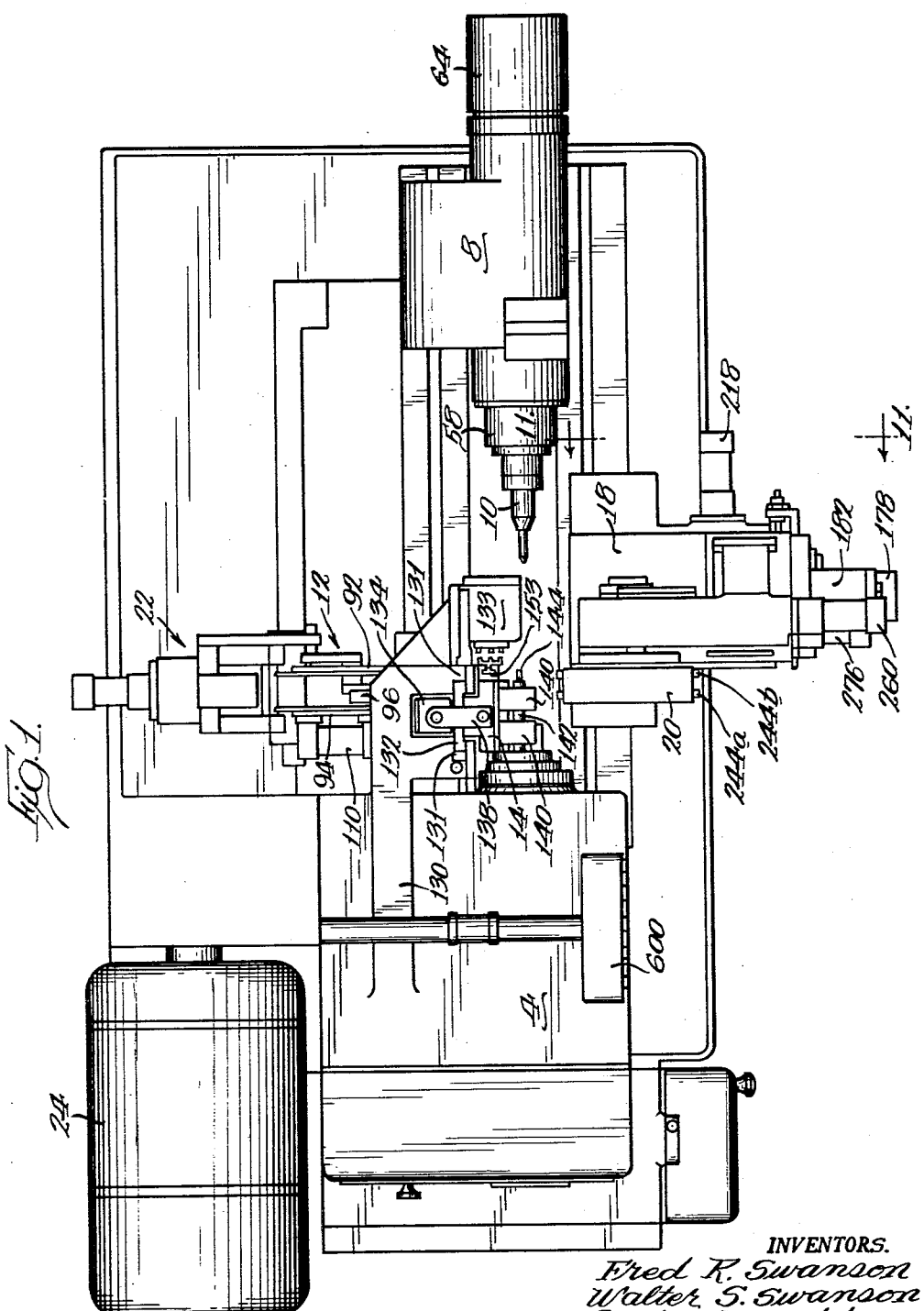

Nov. 28, 1961     F. R. SWANSON ET AL     3,010,348
LATHES
Filed March 17, 1955     14 Sheets-Sheet 3
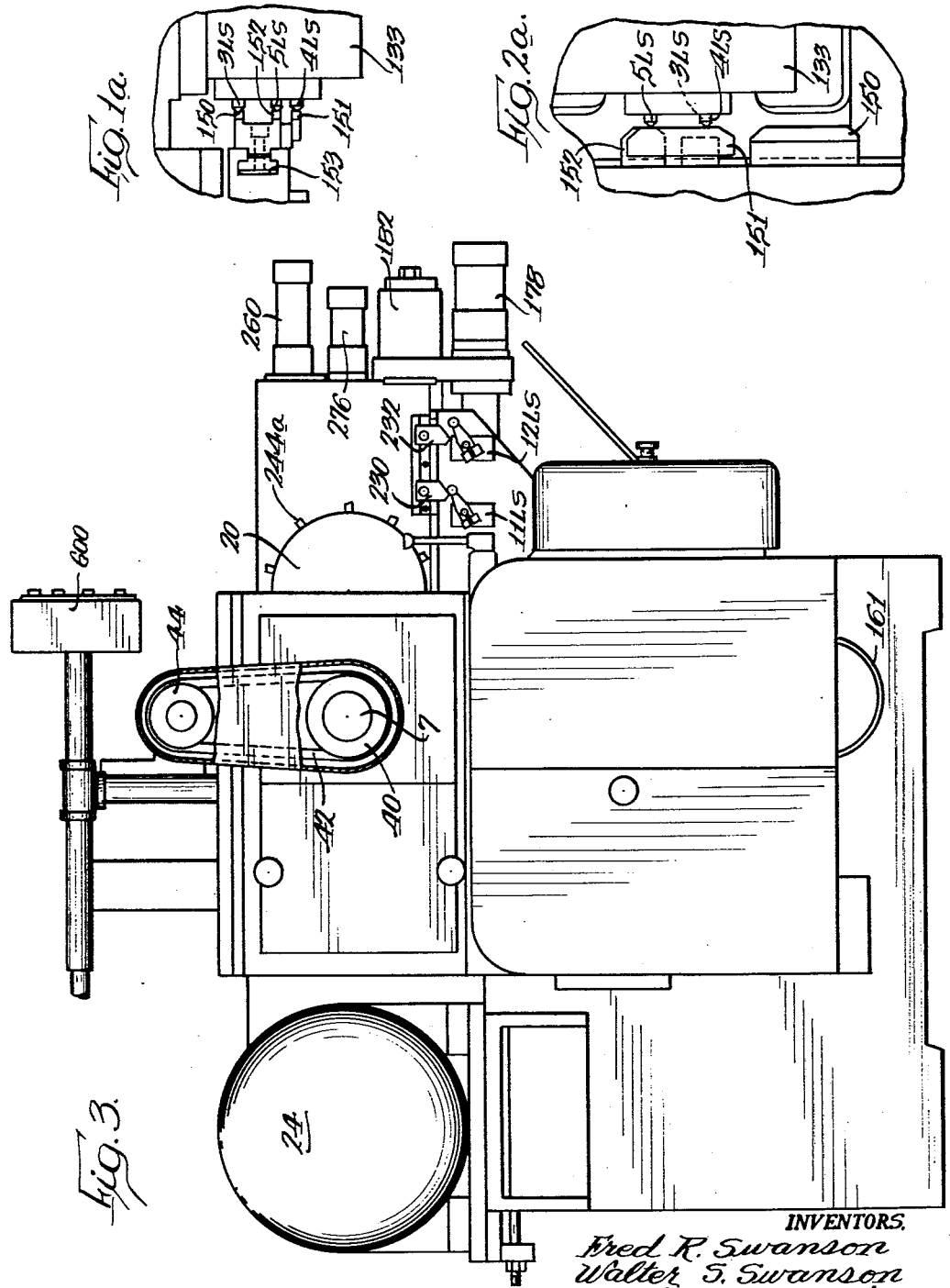
INVENTORS.
Fred R. Swanson
Walter S. Swanson
Gordon L. Nordstrom

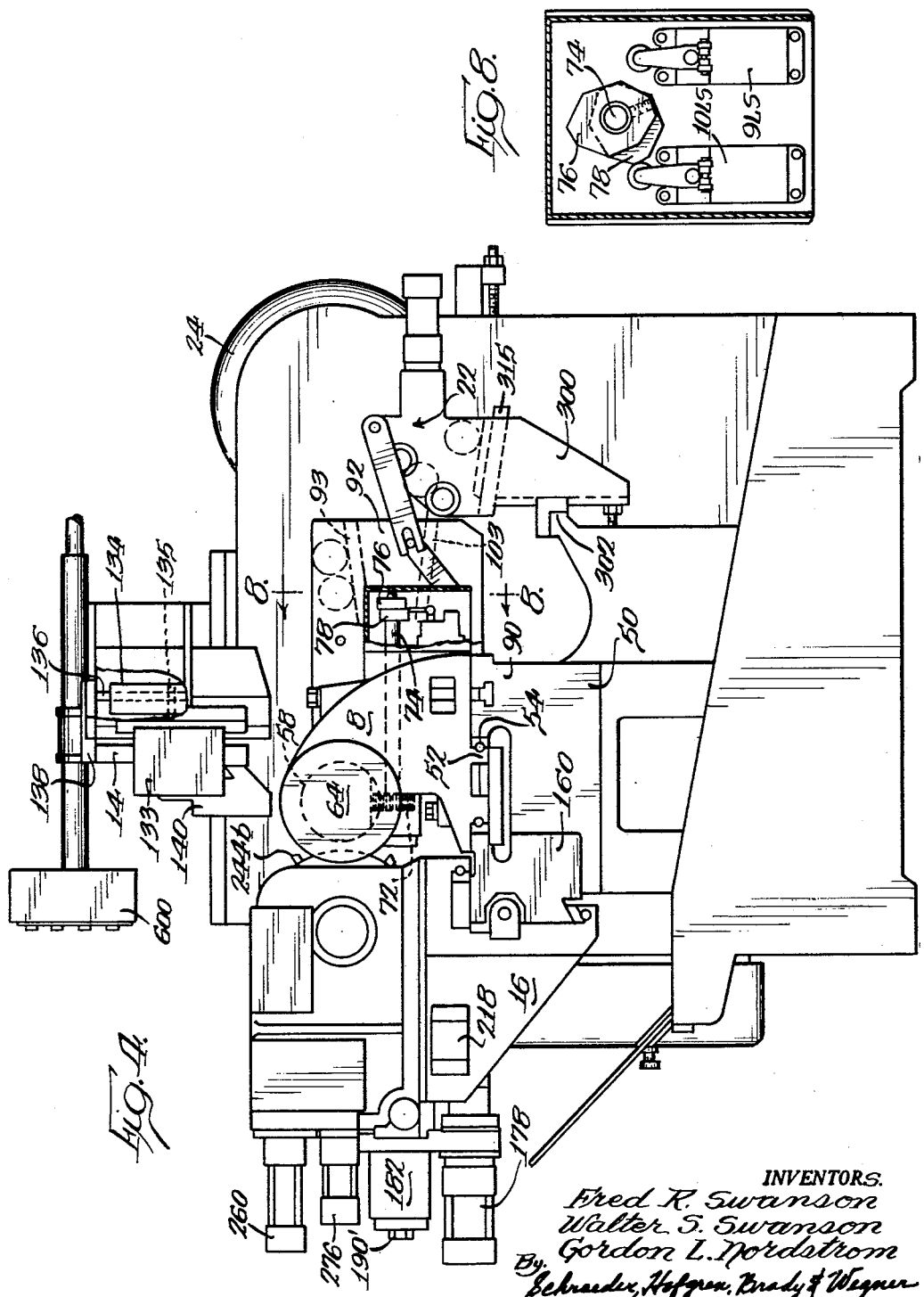

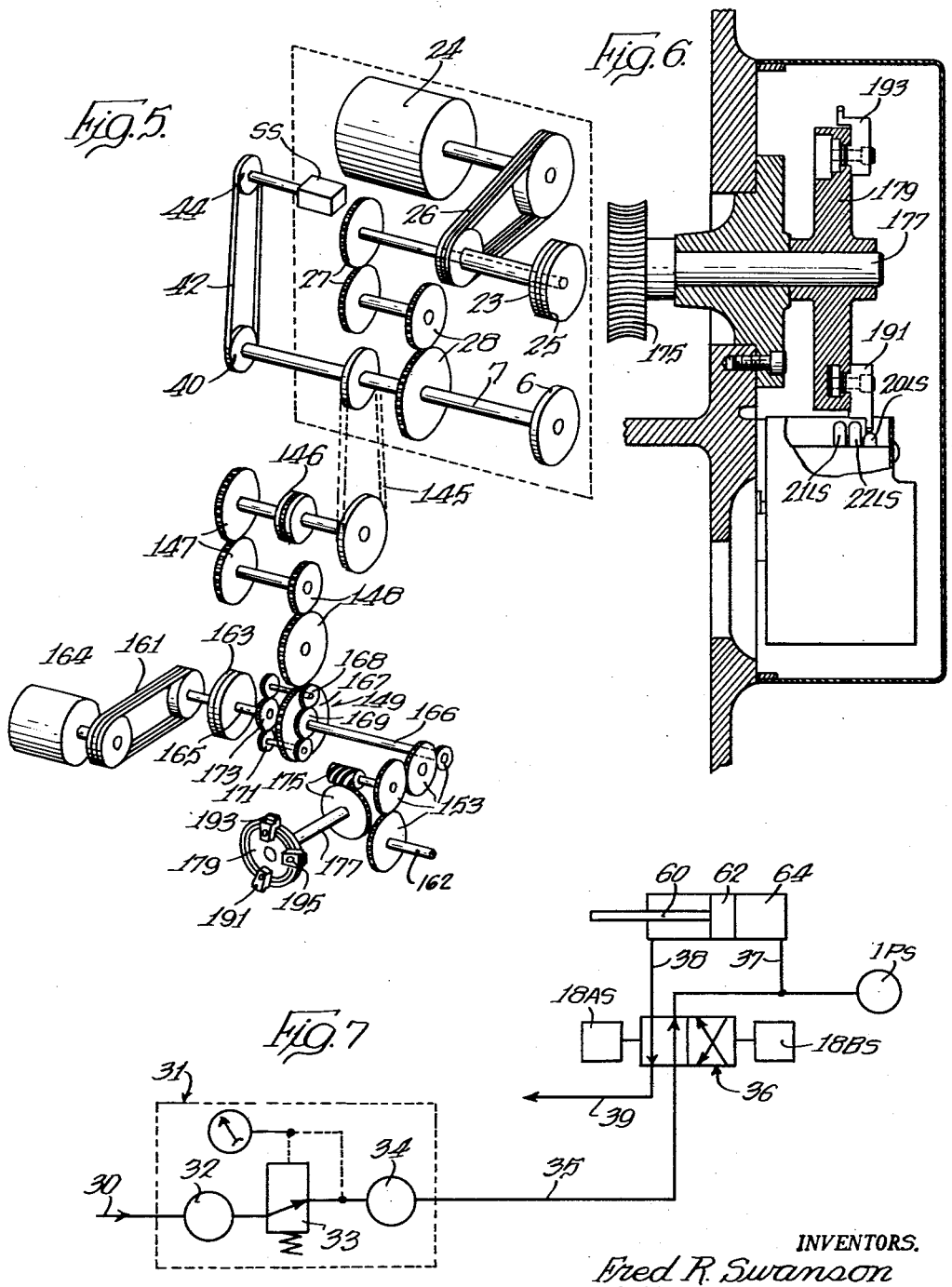

INVENTORS.
Fred R. Swanson
Walter S. Swanson
Gordon L. Nordstrom

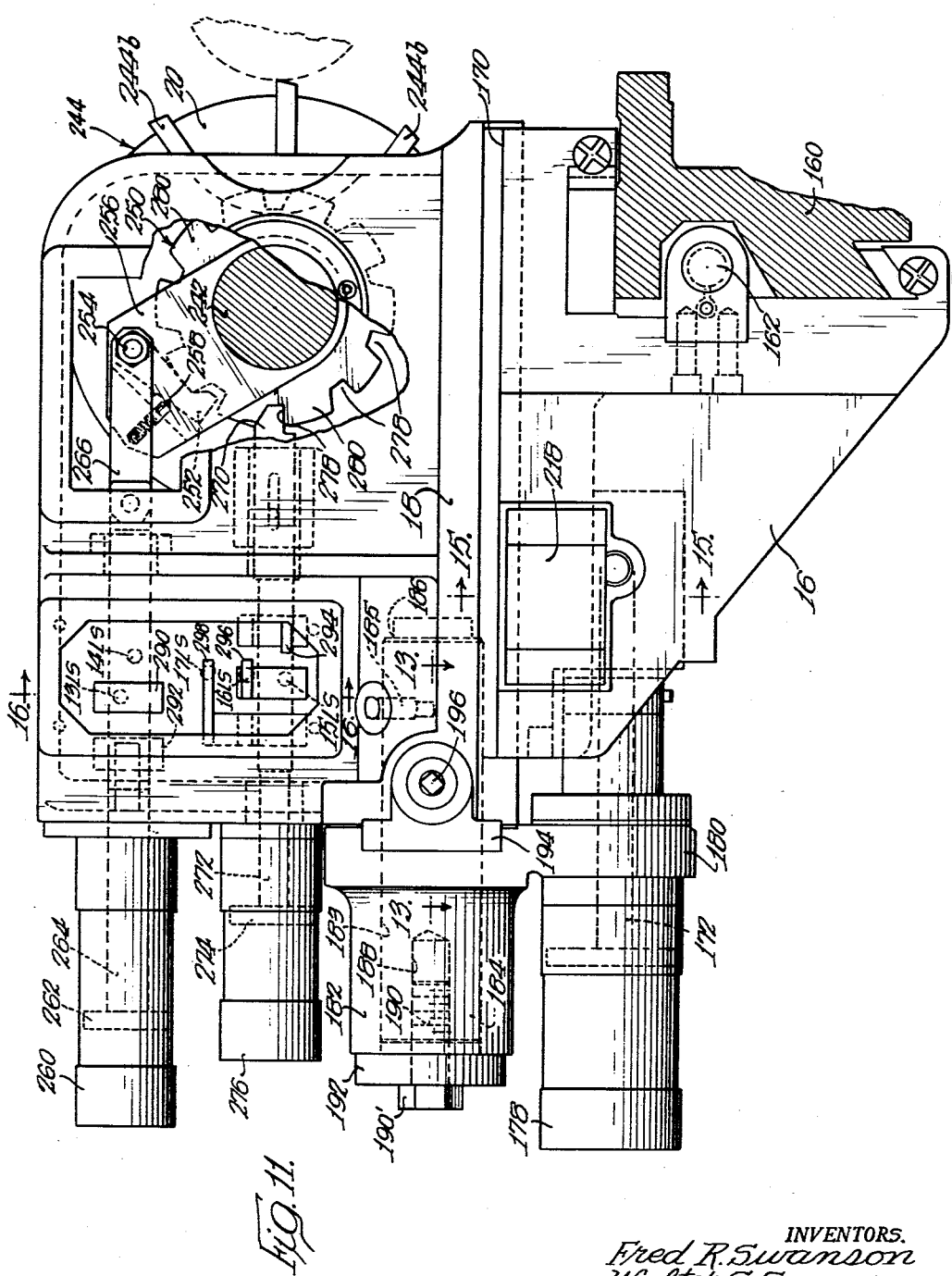

Nov. 28, 1961  F. R. SWANSON ET AL  3,010,348
LATHES
Filed March 17, 1955  14 Sheets-Sheet 8
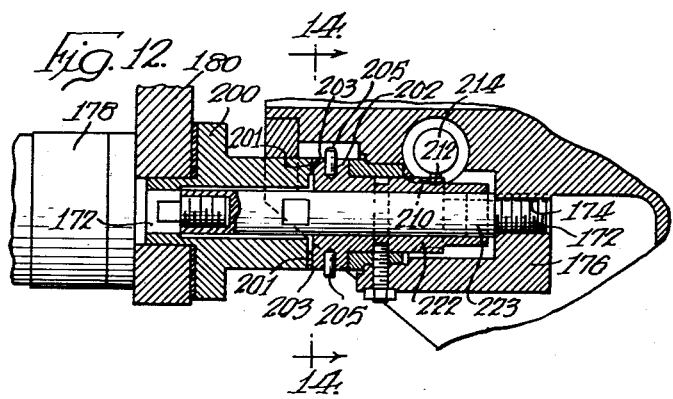
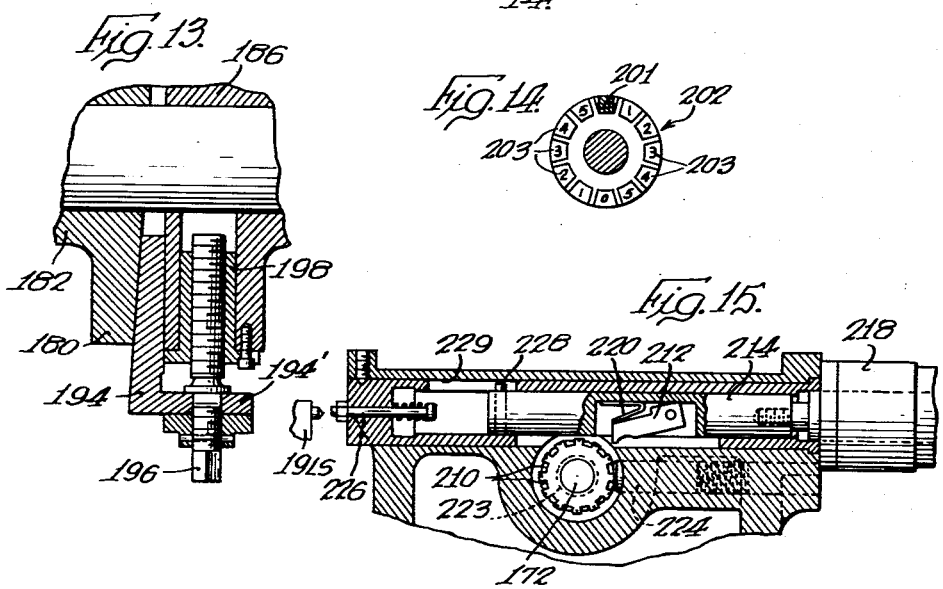
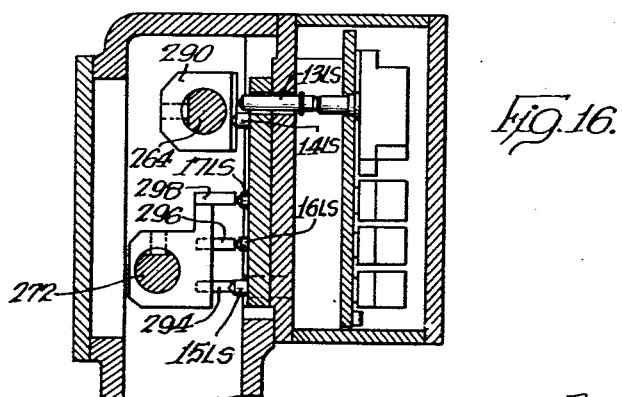
INVENTORS.
Fred R. Swanson
Walter S. Swanson
By: Gordon L. Nordstrom
Schroeder, Hofgren, Brady & Wegner
Attys.

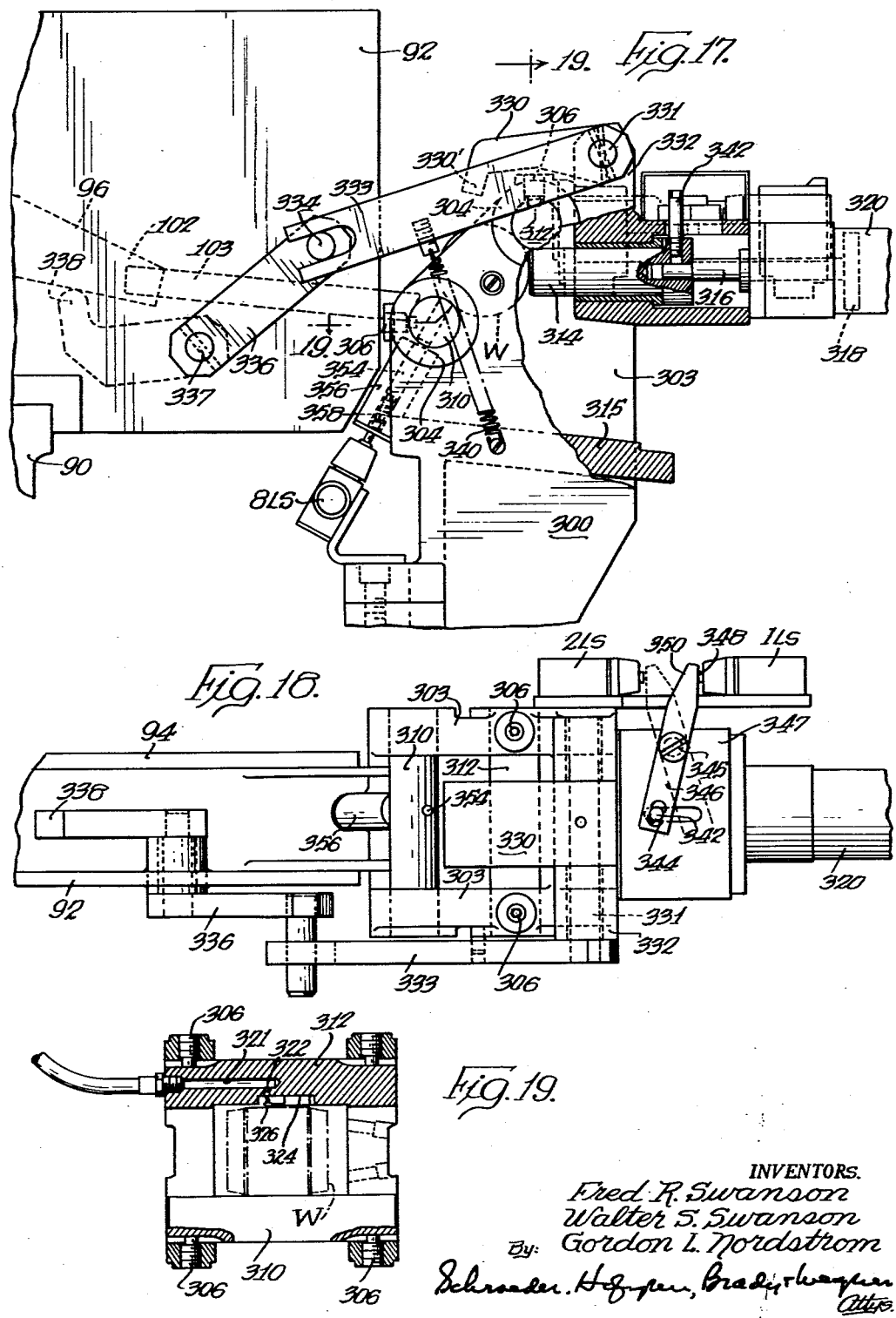

INVENTORS.
Fred R. Swanson
Walter S. Swanson
By: Gordon L. Nordstrom

INVENTORS.
Fred R. Swanson
Walter S. Swanson
By: Gordon L. Nordstrom

Nov. 28, 1961 F. R. SWANSON ET AL 3,010,348
LATHES
Filed March 17, 1955 14 Sheets-Sheet 13

INVENTORS.
Fred R. Swanson
Walter S. Swanson
By: Gordon L. Nordstrom
Schroeder, Hofgren, Brady & Wegner
Attys.

Nov. 28, 1961   F. R. SWANSON ET AL   3,010,348
LATHES
Filed March 17, 1955   14 Sheets-Sheet 14

INVENTORS.
Fred R. Swanson
Walter S. Swanson
By: Gordon L. Nordstrom
Schroeder, Hofgren, Brady & Leeper
Attys

United States Patent Office 3,010,348
Patented Nov. 28, 1961

3,010,348
LATHES
Fred R. Swanson, Walter S. Swanson, and Gordon L. Nordstrom, Rockford, Ill., assignors to Sundstrand Corporation, a corporation of Illinois
Filed Mar. 17, 1955, Ser. No. 494,868
17 Claims. (Cl. 82—2.5)

This invention relates to machine tools and, more particularly to improvements in lathes and has for a general object the prevention of loss of time and material occasioned by tool wear.

A more specific object of the invention is to provide a lathe having rotary work supporting means, a cutting tool, and new and improved gauging means for determining whether the tip of the cutting tool projects the proper distance toward the axis of the work supporting means.

A further object is to provide a lathe having rotary work supporting means, a cutting tool, and new and improved means for gauging a work piece after a work performing operation thereon by the lathe for determining whether the tip of the cutting tool is properly positioned with respect to the axis of the work supporting means.

Another object is to provide a lathe having new and improved means for gauging a work piece after it is removed from the work position to determine tool wear.

Another object of the invention is to provide a lathe having new and improved means for compensating for tool wear.

It is also an object of the invention to provide a lathe of the type described in the preceding paragraph including a plurality of similar cutting tools carried by a rotatable tool turret which may be indexed to present a new tool to a work engaging position when the preceding tool is worn a predetermined amount.

A further object is to provide a new and improved lathe of the type described including a rotary work supporting means, a carriage reciprocable longitudinally of the axis of the work supporting means, a tool support reciprocable on the carriage transversely of the axis of the work supporting means, stop mechanism for controlling movement of the tool support toward the axis of the work supporting means, a rotatable tool turret on the tool support having a plurality of similar cutting tools, means for adjusting the stop mechanism to compensate for increments of tool wear and means for indexing the turret to present a new tool to a work engaging position when the preceding tool is worn to the limit of tolerance.

Another object is to provide a new and improved lathe having a rotary work supporting means, gauging means for determining whether the tip of the cutting tool projects the proper distance toward the axis of the work supporting means, and means controlled by said gauging means for compensating for tool wear.

It is also an object of the invention to provide a new and improved lathe including a headstock having a rotary work supporting spindle mounted therein, a tailstock having a live center mounted therein for movement toward the headstock to clamp a work piece to the spindle, means for loading and unloading a work piece, a carriage reciprocable longitudinally of the spindle axis, a tool slide reciprocable on the carriage transversely of the spindle axis, a tool turret, rotatably mounted on the tool slide, and having a plurality of similar tools, stop means for limiting movement of the tool slide on the carriage toward the spindle axis, gauging means for determining tool wear, means controlled by the gauging means for adjusting the stop means in response to a predetermined increment of tool wear and means controlled by said stop means for indexing the tool turret to present a new tool when the preceding tool is worn to the limit of a predetermined tolerance.

Another object of the invention is to provide a lathe for automatically performing operations including loading and clamping a workpiece for rotation, rotating the workpiece while performing facing and turning operations thereon, releasing and unloading the workpiece, gauging to determine tool wear, and compensating for tool wear.

Other objects and advantages will become apparent from the following detailed description taken in connection with the accompanying drawings, in which:

FIG. 1 is a top plan view of the entire lathe;

FIG. 1a is an enlarged fragmentary top plan view showing the dogs and switches for controlling the movement of the overhead slide;

FIG. 2 is a front elevation of the lathe showing a portion of the tailstock in section;

FIG. 2a is an enlarged fragmentary front elevation showing the dogs and switches for controlling the movement of the overhead slide;

FIG. 3 is an end elevation of the left end of the lathe as viewed in FIG. 2;

FIG. 4 is an end elevation of the right end of the lathe as viewed in FIG. 2;

FIG. 5 is a diagrammatic showing of the drive for the work holder and for the carriage;

FIG. 6 is an enlarged fragmentary sectional view taken on the line 6—6 of FIG. 2, showing the dog disc and switches for controlling the carriage movement;

FIG. 7 is a diagrammatic showing of the air circuit for actuating the tailstock quill;

FIG. 8 is an enlarged fragmentary sectional view taken on the line 8—8 of FIG. 4, showing the limit switches controlled by movement of the tailstock quill;

FIG. 11 is an enlarged elevational view, partly broken away and partly in section, taken on the line 11—11 of FIG. 1 and showing the mechanism for indexing the tool turret;

FIG. 12 is an enlarged fragmentary sectional view taken on the line 12—12 of FIG. 2 showing the mechanism controlling the cross slide;

FIG. 13 is a fragmentary sectional view taken on the line 13—13 of FIG. 11 showing details of the cross slide mounting;

FIG. 14 is a fragmentary sectional view taken on the line 14—14 of FIG. 12 showing the stop disc for limiting cross slide movement;

FIG. 15 is a fragmentary sectional view taken on the line 15—15 of FIG. 11 showing the mechanism for indexing the stop dics;

FIG. 16 is a fragmentary sectional view taken on the line 16—16 of FIG. 11 showing limit switches controlled by the tool turret indexing mechanism;

FIG. 17 is an enlarged fragmentary elevational view taken from the right end of the lathe as viewed in FIG. 1 and showing the gauging mechanism, with parts broken away, and partly in section;

FIG. 18 is an enlarged fragmentary top plan view of the lathe showing the gauging mechanism;

FIG. 19 is a sectional view taken on the line 19—19 of FIG. 17, showing the gauging bars and the valve member controlled by the workpiece;

FIG. 22b is a portion of the wiring diagram, being continued from FIG. 22a;

Figure 9:
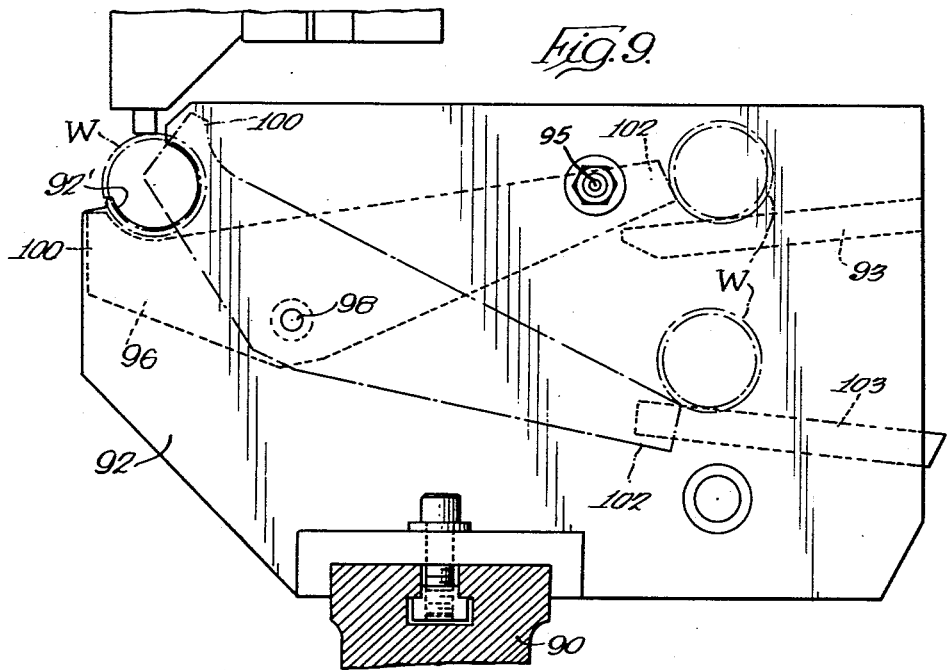
FIG. 9 is an enlarged fragmentary elevational view taken from the right end of the lathe as viewed in FIG. 1 and showing the loading mechanism with its supporting member being shown in section.

The invention further resides in the combination, construction and arrangement of parts illustrated in the accompanying drawings, and while we have shown therein a preferred embodiment, we wish it understood that the same is susceptible of modification and change within the scope of the appended claims.

The lathe in general

Referring now to the drawings, in a preferred embodiment, the lathe includes a base 2, a headstock 4, a rotary workholder 6 on a spindle 7 mounted in the headstock, a tailstock 8 having a live center 10 mounted therein for movement toward and away from the headstock, a mechanism 12 for loading and unloading workpieces, an overhead slide 14 carrying facing tools, a front carriage 16 having a cross slide 18 supporting a tool turret 20, and a mechanism 22 for gauging finished workpieces to determine whether the finish diameter is within predetermined limits of tolerance and hence whether the tip of the cutting tool is properly positioned with respect to the axis of the workholder. The gauging mechanism 22 is arranged to initiate adjustment of means for controlling the position of the cross slide 18 to compensate for tool wear when it is determined by gauging the finished workpiece that the tip of the tool, because of wear, does not project toward the axis of the workholder to the desired position. The turret 20 carries a plurality of similar sets of tools and the turret may be indexed to present a new set of tools to work engaging position when the set in use becomes worn by a predetermined amount.

The lathe, as illustrated, is entirely automatic in its operation. Briefly, this automatic operation includes loading a rough workpiece after delivery of a finished workpiece to the gauging mechanism, advancement of the tailstock center 10 to pick up the loaded rough workpiece, advancement of the cross slide toward the axis of the workholder, energization of the workholder drive and initiation of a complete work performing operation after the previously machined workpiece has been gauged, interruption of the workholder drive and retraction of the cross slide when the carriage 16 reaches the end of its cutting stroke, retraction of the tailstock center 10 when the workholder 6 stops rotating, unloading and delivery of a finished workpiece to the gauging mechanism 22 in response to retraction of the tailstock center 10, and automatic adjustment to compensate for tool wear and initiation of a new cycle of operation as controlled by the gauging mechanism.

The headstock

Referring to FIGURE 5, the spindle 7 is arranged to be driven from a motor 24 through a multiple belt drive 26, a clutch and brake device having a clutch coil 23 and a brake coil 25, replaceable speed change gears 27, and gearing 28. The motor 24 is continuously energized during operation of the lathe and the clutch and brake coils 23 and 25 are automatically controlled to control the rotation of the workholder 6. The clutch coil 23 is energized, and the brake coil 25 simultaneously deenergized, to rotate the workholder after the cross slide 18 is advanced toward the axis of the workholder. The clutch coil 23 is deenergized, and the brake coil 25 simultaneously energized, to stop rotation of the workholder after the carriage 16 reaches the end of a cutting stroke.

Referring to FIGS. 2, 3 and 5, a pulley 40 mounted on the end of the workholder spindle 7, is connected by a belt 42 to a pulley 44 secured to the shaft of a zero speed switch SS. The zero speed switch SS is a conventional switch device which responds to the cessation of rotation by effecting the closure of contacts contained therein. As described more in detail hereinafter in connection with a description of the wiring diagram, this function of the zero speed switch is utilized to effect a withdrawal of the tail stock center 10 when the workholder stops rotating.

The tailstock

Referring to FIG. 4, the tailstock 8 is mounted on a bed 50 integral with the base 2, and is slidably guided by co-operating ways 52 and 54 on the tailstock and bed, respectively, for adjustment longitudinally of the axis of the workholder 6.

As best shown in FIG. 2, the tailstock includes a bearing bracket 56 in which there is mounted a tubular quill 58. The quill 58 is held against rotation and is mounted for reciprocal movement longitudinally of the axis of the workholder so that the center 10 supported thereby may be advanced toward the headstock to clamp a workpiece to the workholder 6 for rotation therewith during a work performing operation. Quill 58 is adjustably connected at 59 to a rod 60 secured to a piston 62 mounted in a cylinder 64 supported on the bearing bracket 56. The tailstock center 10 is secured to a shaft 66 rotatably mounted by means of bearings 68 in the quill 58.

Referring to FIG. 7, air under pressure is admitted to opposite ends of the cylinder 64 to advance and retract the center 10 by means of a pressure system including a line 30 connected to a source of air under pressure. The line 30 is connected to a control unit 31 including an air line filter 32, a pressure regulator 33, and an oil-air mist lubricator 34 which provides lubrication for the piston and cylinder 62 and 64. A line 35 connects the control unit 31 to a four-way, two-position valve 36 controlled by solenoids 18AS and 18BS. The valve 36 is connected by a line 37 to the right end of the cylinder 64 and by a line 38 to the left end of the cylinder 64, and a line 39 connects the valve 36 to exhaust. A pressure switch 1PS is connected in the line 37 to close its contacts when pressure builds up in the right end of the cylinder 64, for a purpose that will be explained in connection with a description of the wiring diagram. When the solenoid 18AS is energized, the valve 36 is positioned to connect the lines 35 and 37 to supply air under pressure to the right end of cylinder 64 to advance the tailstock center; in this position of the valve the lines 38 and 39 are connected to place the left end of cylinder 64 in communication with the exhaust. When the solenoid 18BS is energized, the valve is moved to a position to connect the lines 35 and 38 to admit air under pressure to the left end of cylinder 64 to retract the tailstock center; in this position of the valve the lines 37 and 39 are connected to place the right end of cylinder 64 in communication with the exhaust.

As described more in detail hereinafter, the solenoid 18AS is energized to advance the tailstock center after a gauging operation. The solenoid 18BS is energized to retract the center 10 under the control of the zero speed switch SS when the workholder 6 stops rotating.

According to the invention, movement of the tailstock center toward and away from the headstock controls other functions. To this end, the tailstock quill 58 is provided with an integral rack gear 70, FIG. 2, which meshes with a pinion 72 secured to one end of a shaft 74 having secured to its opposite end switch actuating dogs 76 and 78, FIG. 4. Referring to FIG. 8, the dogs 76 and 78 are arranged to actuate limit switches 9LS and 10LS, respectively, when the tailstock quill is retracted and extended, respectively. The switch 10LS is utilized in initiating cross slide movement inwardly after the tailstock quill 58 is advanced to clamp the workpiece to the workholder. The switch 9LS initiates operation of the loading mechanism 12 to unload and deliver the finished workpiece to the gauging mechanism 22 when the tailstock quill 58 is retracted.

Loading and unloading mechanism

Figure 10:
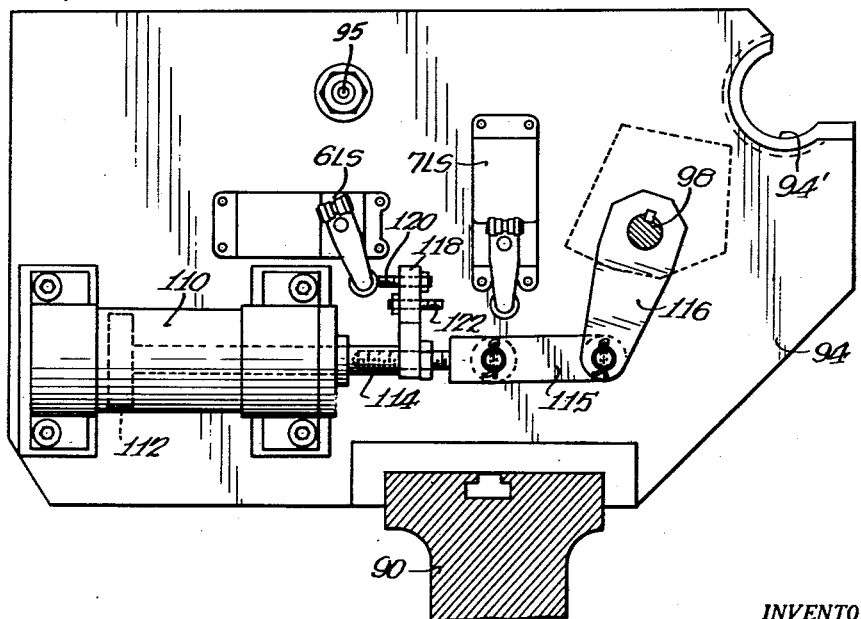
FIG. 10 is an enlarged fragmentary elevational view taken from the opposite side of the loading mechanism.

Referring now to FIGS. 9 and 10, a guide 90 is provided on the bed 50, extending longitudinally of the axis of the workholder 6, to adjustably support spaced guide panels 92 and 94 which extend transversely of the axis of the workholder for guiding a workpiece into position for pickup by the tailstock center 10 and the workholder 6. The loading mechanism comprises an arm 96 located between the panels 92 and 94 and secured to a pin 98 journalled in a bearing on the panel 94. The arm 96 includes, at the forward end thereof, an upwardly projecting tip portion 100 which defines a curved seat for supporting and retaining a workpiece in position for pickup, as illustrated by the broken line showing of the arm 96 in FIG. 9. The panels 92 and 94 are formed with arcuately recessed portions 92' and 94', respectively, which are concentric with the axis of the workholder 6 and tailstock center 10 and allow the workpiece to be picked up and clamped between the workholder and tailstock center when the tailstock center is advanced.

A guide rail 93 is secured to each of the panels 92 and 94 to provide a forwardly and downwardly inclined track on which a rough workpiece may be rolled into position for delivery to the pivoted loading arm 96. Movement of the workpiece down the inclined rails 93 is limited by pins which project inwardly from panels 92 and 94 as at 95. When the tail end 102 of the arm 96 is raised from the position shown in full line in FIG. 9 to the position shown in broken line, it lifts one workpiece over the pins 95 to roll down the arm and holds back a second workpiece. A guide rail 103 is also supported on each of the panels 92 and 94, beneath the guide rails 93. The rails 103 define a downwardly and rearwardly inclined track to which the finished workpiece is delivered when the tail end 102 of pivoted loading arm 96 is lowered from the work loading position after the work performing operation has been completed. The guide rails 103 deliver the finished workpiece to the gauging mechanism 22.

Referring now to FIG. 10, the pivoted loading arm 96 is actuated by a piston and cylinder device including a cylinder 110 secured to panel 94 and having a piston 112 connected by rod 114 to a pivoted link 115. The link 115 is also pivotally connected to an arm 116 secured to the pivot pin 98. In the automatic operation of the lathe, fluid is admitted to the cylinder 110 to pivot the arm 96 to load a rough workpiece after the previously machined workpiece is delivered to the gauging mechanism 22. Fluid is admitted to the cylinder 110 to pivot the arm 96 to unload a workpiece under control of the limit switch 9LS which is actuated when the tailstock quill is retracted.

Operation of the loading and unloading mechanism automatically initiates other operations and for this purpose a dog 118 is secured to the piston rod 114 and is provided with pins 120 and 122 which actuate limit switches 6LS and 7LS, respectively, when the pivoted arm 96 is in loading and unloading positions, respectively. The limit switch 6LS controls the admission of air to the tailstock cylinder 64 to extend the tailstock quill 58. The function of the switch 7LS is described in connection with the wiring diagram.

The overhead slide

Referring to FIG. 1, the overhead slide 14 is mounted for vertical reciprocation on a bracket 130 extending from the head stock 4. The bracket 130 is provided with ways 131 which slidably receive a guide 132 integral with the slide 14. Referring to FIG. 4, the slide is actuated by means of a cylinder 134 having a piston 135 connected by a rod 136 to an arm 138 secured to and extending rearwardly from the slide. Tool holders 140 are mounted on the front of the slide by means of conventional dovetailed connections for adjustment longitudinally of the axis of the workholder by means of an adjustment screw 142 having a squared end portion 144 adapted to receive a tool or wrench. Each of the tool holders 140 carries a facing tool 146 to perform facing operations on the workpiece when the slide 14 is lowered into work position.

The overhead slide may be lowered at any desirable time in a cycle of operation. As illustrated, the slide 14 is lowered in response to actuation of a switch 11LS, subsequently described, which is actuated when the cross slide 18 on the front carriage 16 is advanced toward the the axis of the workholder. Referring to FIGS. 1a and 2a, downward movement of the slide and its return movement upwardly are controlled by dogs 150, 151 and 152, secured in a slot 153 on the slide for engagement with limit switches 3LS, 4LS and 5LS, respectively, mounted in a switch box 133 secured on the bracket 130. The limit switch 11LS initiates downward movement of the overhead slide at a rapid approach speed. When the dog 151 engages the switch 4LS, the rapid approach speed is converted to a slower, feed or cutting speed. When the dog 152 engages the switch 5LS, the downward movement of the overhead slide is terminated and its movement upwardly is initiated after a short delay controlled by an adjustable timer device described in connection with the wiring diagram. When the dog 150 engages the switch 3LS, rapid return movement of the overhead slide is terminated and the slide remains in this position until subsequently actuated in another cycle.

The carriage

The carriage 16 is mounted on a guideway 160 on the bed 50, FIG. 4, which extends longitudinally of the axis of the work holder 6. The carriage is arranged to be driven by a feed screw 162, FIGS. 2 and 5, connected in a conventional manner to the carriage and arranged to be driven from two sources to provide a rapid forward approach movement, a slower forward speed movement, and a rapid return movement. Firstly, the feed screw is driven from the rotary workholder spindle 7 through the chain 145, a manually controllable feed clutch 146, replaceable feed change gears 147, gearing 148, differential or planetary gearing 149, shaft 166 and gearing 153. Secondly, the feed screw is driven from a reversible high speed motor 164 through a multiple belt drive 161, brake 163, shaft 165, the differential or planetary gearing 149 and the gearing previously described. The brake 163 is controlled by a winding 163', best shown in the wiring diagram, to be released on energization of the motor 164 and applied on deenergization of the motor.

The differential gearing 149 includes a geared planetary gear carrier 167 having planetary pinions 168 on one side thereof in mesh with a sun gear 169 on the shaft 166. The planetary carrier 167 also carries pinions 171 on the opposite side thereof in mesh with a sun gear 173 on the shaft 165.

With the spindle motor 24 energized, with the clutch coil 23 energized and the brake coil 25 deenergized, with the reversible rapid traverse motor 164 deenergized and the brake coil 163' energized, the feed screw will be driven at its slow forward feed or cutting speed. Or, with the spindle motor 24 energized, the clutch coil 23 energized and the brake coil 25 deenergized, the reversible motor 164 may be energized in one direction, and the brake coil 163' deenergized, to drive the feed screw at a rapid forward approach speed. When the spindle motor 24 and clutch coil 23 are deenergized, and the brake coil 25 energized, the reversible motor 164 may be energized in a reverse direction, and the brake coil 163' deenergized, to drive the feed screw at a rapid return speed.

Movement of the carriage is controlled in part by a control dog disc 179 on a shaft 177 which is driven through worm gearing 175 from the feed screw drive gearing 153. The dog disc 179 is provided with circumferentially adjustable dogs 191, 193 and 195, arranged to actuate limit switches 20LS, 21LS and 22LS, respectively.

In the automatic cycle of operation, the carriage is initially positioned at the limit of its return stroke. In this position of the carriage, dog 191 actuates the switch 20LS. Movement of the carriage at a rapid approach speed is initiated after the cross slide 18 is advanced toward the axis of the workholder 6. As the carriage advances, the dog disc 179 rotates proportionately, and the dog 195 moves to a position to actuate the switch 22LS which functions to deenergize the rapid traverse motor 164 and energize the brake coil 163' to convert the carriage movement to the slow forward feed speed. On continued rotation of the disc 179, the dog 193 moves to a position to actuate the switch 21LS to terminate the forward movement of the carriage. Rapid return movement of the carriage is initiated after the cross slide 18 is withdrawn from the axis of the workholder 6 at the end of a cutting stroke. Rapid return movement of the carriage is terminated when the reversely rotating disc 179 moves the dog 191 to a position to actuate the switch 20LS.

According to the invention, movement of the carriage automatically controls other operations. Thus, when the switch 21LS is actuated by the carriage at the end of a cutting stroke, this switch also disables the drive for the workholder 6 and initiates outward movement of the cross slide 18 to withdraw the slide during return movement of the carriage, as set forth more fully in connection with a description of the wiring diagram.

The cross slide

Referring now to FIG. 11, the cross slide 18 is slidably mounted on the carriage 16 between guides 170, one of which is seen in FIG. 11. The slide 18 is moved on the carriage toward and away from the axis of the workholder 6 by means of a piston and cylinder device including a piston rod 172, FIG. 12, screwed at one end into a threaded bore 174 in a depending portion 176 on the carriage 16. At its opposite end the rod 172 is provided with a piston mounted in a cylinder 178, FIG. 11, rigidly secured to a bracket 180 mounted for adjustment on the cross slide. The bracket 180 is provided with an integral tubular-shaped housing 182 having a bore 183 slidably fitted for adjustment on a rod 184 rigidly held by a pin 185 in a housing 186 integral with the cross slide 18. The rod 184 is provided with a threaded bore 188 which receives a cap screw 190 having a head 190' seated against a plate 192 which covers the end of the housing 182. Referring to FIG. 13, wedge member 194 is fitted between the faces of the housings 182 and 186. The wedge member 194 is provided with an angularly extending portion 194' which receives an adjustment screw 196 mounted for rotation therein but held against axial movement with respect thereto. The adjustment screw 196 is threaded into a plug 198 securely mounted in the housing 186.

To adjust the slide 18 outwardly with respect to the carriage, the wedge member may be withdrawn by running the screw 196 outwardly and the cap screw 190 thereafter tightened to draw the slide 18 away from the axis of the workholder 6. To adjust the cross slide inwardly with respect to the carriage, after loosening the cap screw 190, the member 194 may be wedged inwardly to spread the housings 182 and 186, thus moving the slide 18 toward the axis of the workholder 6.

Fluid is admitted to the cylinder 178 to advance the cross slide 18 toward the axis of the workholder 6 under control of limit switch 10LS, previously described, which is actuated when the tailstock center 10 is advanced to clamp a workpiece to the workholder 6. Fluid is admitted to the cylinder 178 to withdraw the cross slide away from the axis of the workholder 6 when the limit switch 21LS is actuated at the end of the carriage feed stroke.

In the automatic operation of the lathe, movement of the slide 18 toward and away from the axis of the workholder controls other operations. For this purpose, dogs 230 and 232, FIG. 3, are secured to the side of the cross slide and are arranged to actuate limit switches 11LS and 12LS, respectively. The limit switch 11LS is actuated by the dog 230 when the slide is in its advanced position to initiate rotation of the workholder, to initiate carriage movement, and to initiate movement of the overhead slide 14 downwardly. The limit switch 12LS is actuated by the dog 232 when the slide is in its withdrawn position to initiate rapid return movement of the carriage.

Referring to FIG. 12, movement of the slide 18 toward the axis of the workholder 6 is limited by a tubular stop member 200 secured to the bracket 180 and concentrically embracing the piston rod 172. The stop member 200 is provided with a pair of diametrically opposite, axially projecting stops 201 arranged to engage stepped stops on the face of a stop disc 202 rotatably indexable on the piston rod 172 but secured against axial movement thereon. Referring to FIG. 14, the stop disc 202 is provided on its face with six sets of circumferentially arranged stops, the sets being numbered 0, 1, 2, 3, 4 and 5, and each set including a pair of diametrically opposed, axially projecting stops 203 arranged for engagement with the stops 201. The sets 0–5 are graduated so that each succeeding set projects toward the stops 201 a predetermined amount less than the preceding set which may, for example, be .0005".

Thus, when the slide 18 is in a withdrawn position, the disc 202 may be indexed to position a succeeding set of stops for engagement with stops 201, and the succeeding set will allow the cross slide 18 to move nearer the axis of the workholder. The disc 202 is indexed to compensate for tool wear when the finishing tool of the set of tools in work engaging position is worn to the limit of a predetermined tolerance, that is, by an amount equal to the graduation between successive sets of the stops 203, which, as illustrated, is .0005".

Tool wear is determined by the gauging mechanism 22 which, as subsequently described, gauges each workpiece after a work performing operation thereon to determine whether the finish diameter exceeds the predetermined limit of tolerance, and hence whether the tool is worn to the tolerable limit. When it is determined by the gauging mechanism that the tool is worn to the allowable limit, the disc 202 is automaticlly indexed, as described hereinafter.

Referring to FIGS. 12 and 15, the disc 202 is indexed by means of a ratchet gear 210 formed on a tubular shaft 222 integral with the disc. The ratchet is actuated by a pawl 212 carried by a rod 214 secured to a piston in a cylinder 218. The rod 214 is prevented from rotation by a pin 228 secured thereto and guided in a groove 229. The pawl 212, pivotally mounted on the rod 214, is biased downwardly by a spring 220 to insure engagement with the ratchet 210. The shaft 222 is provided with flattened surfaces 223 corresponding in number and spacing to the ratchet teeth, and a spring pressed rod 224 is arranged to bear against the flattened surfaces 223 to accurately detain the ratchet 210 and disc 202 in the desired position.

Fluid is admitted to the cylinder 218 to index the disc 202 under control of the gauging mechanism 22. As the piston rod 214 advances to index the ratchet 210, it strikes a spring biased plunger 226 which actuates a limit switch 19LS to reverse the admission of fluid to the cylinder 218 and return the pawl 212 to its original position.

Operation of the lathe is begun with a new set of tools on the turret 20 in work engaging position and with the set 0 of stops 203 in position to control the transverse position of the slide 18. It is apparent that the six sets 0–5 allow the disc 202 to be indexed five times to compensate for wear on a single set of tools. On the sixth indexing, after the tool has been worn by .0005" for the sixth time, the disc 202 will have been indexed through 180° and the set 0 of stops 203 will again be in position to control the slide 18. This necessitates the indexing of the turret 20 to present a new set of tools to work engaging position. For this purpose, the disc 202 is provided with a pair of radially projecting switch actuating pins 205 on the same diameter with the set 0 of stops 203. The pins are arranged to actuate a switch 18LS, FIG. 2, which, as subsequently described, initiates an indexing of the turret 20 after every sixth indexing of the disc 202.

It will be appreciated that a number of work performing operations may be performed with each set of tools on the turret 20 before the wear on the tools need be compensated for. The disc 202 permits compensation for wear on each set of tools for as many as five times, and the indexable turret carries a plurality of similar sets of tools which may be successively indexed into work position after the preceding set has been worn for the sixth time. Thus, the lathe provides for continuous automatic operation for extended periods of time while at the same time insuring the production of finished workpieces minutely conforming the desired specifications.

*The turret*

Referring to FIG. 11, the tool supporting turret 20 is secured to a shaft 242 rotatably mounted on the cross slide 18. The turret carries ten similar sets of cutting tools 244. Each of the sets 244 includes a roughing tool 244a and a finishing tool 244b mounted side by side. The turret is indexed to present succeeding sets of tools to a work engaging position by means of a ratchet 250 secured to the shaft 242 and actuated by a pawl 252. The pawl is pivotally mounted at 254 on a plate 256 rotatably supported on the shaft 242. A spring biased pin 258 urges the pawl into engagement with the ratchet 250. The plate 256 is oscillated by means of a piston and cylinder device including cylinder 260 and a piston 262 having a rod 264 extending from the cylinder. A link 266 is pivotally connected to the rod 264 and to the plate 256 at 254. Fluid is admitted to opposite ends of the cylinder 260 to drive the pawl and ratchet to index the turret.

Movement of the turret indexing pawl controls other operations. To this end, the rod 264, which is connected to actuate the pawl 252, is provided with dogs 290 and 292, which are arranged to actuate limit switches 13LS and 14LS, respectively. The dog 290 actuates the limit switch 13LS when the pawl 252 is at the end of its driving stroke. The dog 292 actuates the switch 14LS when the pawl 252 is at the end of its return stroke. The function of the switches 13LS and 14LS is described presently.

The turret 20 is securely detented in its successive positions by means of a plunger 270 formed on the end of a rod 272 connected to a piston 274 in a cylinder 276. The plunger 270 is adapted to fit in the recesses 278 between the teeth 280 on the ratchet. The recesses 278 are all similarly formed except for the recess 278' which is deeper than the other recesses for a purpose that will appear.

Referring to FIGS. 11 and 16, rod 272 to which the detent plunger 270 is secured is provided with dogs 294, 296 and 298, which are arranged to actuate limit switches 15LS, 16LS and 17LS, respectively. The dog 294 actuates the switch 15LS when the plunger 270 is in its retracted position. The dog 296 actuates the switch 16LS when the plunger is in its extended position in engagement with any of the recesses 278. The dog 298 is arranged to actuate the limit switch 17LS when the plunger is in its extended position in engagement with the recess 278'.

The indexing operation of the turret 20 to present a new set of tools 244 to a work engaging position is initiated when the limit switch 18LS is actuated by one of the pins 205 after one-half revolution of the stop disc 202. In response to the actuation of the switch 18LS, fluid is admitted to the cylinder 276 to retract the plunger 270 from its detenting engagement with one of the spaces 278. When the plunger 270 is retracted, the limit switch 15LS is actuated by the dog 294. Actuation of the switch 15LS initiates admission of fluid to the cylinder 260 to actuate the pawl 252 in its driving stroke to index the turret 20.

When the indexing pawl 252 is at the end of its driving stroke, the dog 290 actuates the limit switch 13LS. Switch 13LS initiates an admission of fluid to the cylinder 276 to return the detent plunger to its extended position in engagement with one of the recesses 278. When the plunger 270 is returned to its extended position, the dog 296 actuates the limit switch 16LS. The switch 16LS, when actuated, initiates an admission of fluid to the cylinder 260 to return the pawl 252 to its original position. Actuation of the switch 14LS by the dog 292, when the pawl 252 is returned to its original position, conditions the circuit for continuation of the automatic operation of the lathe.

Operation is begun with the turret 20 indexed to a position in which the plunger 270 is received in the deep recess 278'. After a complete revolution of the turret 20, when all of the sets of tools have been worn, the plunger 270 will again be received in recess 278'. When the plunger 270 is engaged with this recess, the dog 298 actuates the switch 17LS which is connected in circuit to terminate the automatic operation of the lathe.

*Gauging mechanism*

The gauging mechanism comprises a frame 300, FIG. 4, which is adjustably supported on a guide 302 extending longitudinally of the base 2 of the lathe. Referring to FIGS. 17 and 18, the frame 300 includes spaced parallel panels 303 which extend rearwardly from the guide rails 103 of the loading mechanism. Parallel gauging bars 310 and 312 are supported at opposite ends in bearings 304 on the panels 303. The bars 310 and 312 are spaced apart by a distance slightly greater than the desired diameter of a finished workpiece and are rigidly held in the bearings by pins 306 which pass through the bearings and are seated in recesses in the bars. The guide rails 103 extend to a position immediately adjacent the gauging bar 310. Thus, a finished workpiece delivered to the rails 103 by the pivoted loading arm 96 rolls into position between the gauging bars 310 and 312.

A positive stop bar 314 (FIG. 17) limits movement of the workpiece between the gauging bars and supports the workpiece in gauging position. For actuation, the stop bar 314 is secured to the end of a rod 316 connected to a piston 318 in a cylinder 320. The workpiece is urged into gauging position between the gauging bars 310 and 312 by means of an arm 330 secured to a pin 331 journalled in ears 332 projecting upwardly from the panels 303. The angular end portion 330' of the arm 330 is biased to a position between the gauging bars 310 and 312 by means of a spring 340 anchored on the panel 303 and connected at its other end to an arm 333 secured to the pin 331. When the stop bar 314 is retracted, the workpiece is urged through the passage between the gauging bars, and falls to a shelf 315 extending between the panels 303 below the gauging bars.

The arm 330 is raised to permit entrance of a workpiece into gauging position by means of an arm 336 secured to a pin 337 journalled in a bearing on the panel 92 beneath the guide rail 103 and having a pin and slot connection with the arm 333. An arm 338, also secured to the pin 337, is actuated by the loading arm 96 when its tail portion 102 is lowered to deliver the workpiece to the guide rails 103. When the loading arm 96 is again raised, the arm 330 will be urged into engagement with the workpiece by the spring 340.

As the workpiece rolls into gauging position between the bars 310 and 312, it actuates a switch 8LS, FIG. 17, secured to the frame 300. The switch 8LS is actuated through the medium of a spring biased plunger 354 reciprocably mounted in a housing 356. The plunger passes diametrically through the bar 310 and extends slightly therebeyond to be depressed by the workpiece. The limit switch 8LS, when actuated, initiates the admission of fluid to the cylinder 110 to pivot the loading arm 96 to a position in which it lifts a rough workpiece over the pins 95 and delivers it into position for pickup by the tailstock center 10 and the workholder 6. Actuation of the switch 8LS also causes delay of other operations in the lathe for a period which allows the gauging mechanism to function.

Figure 20:
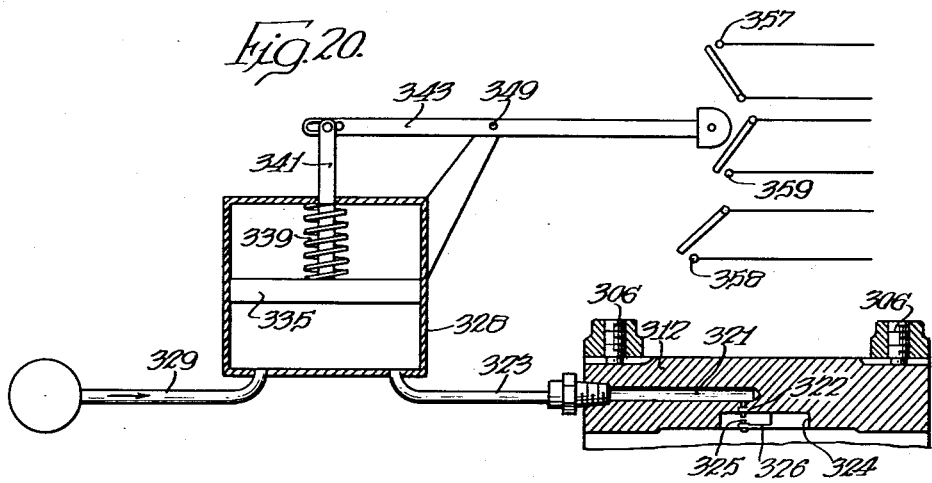
FIG. 20 is a diagrammatic showing of the air circuit controlled by the gauging mechanism.

Referring to FIGS. 19 and 20, the gauging bar 312 is provided with a longitudinal bore 321 and an interesting radial orifice 322. A conduit 323 is connected to the bore 321 and to an air pressure system arranged to be controlled by a workpiece in position between the gauging bars. The bar 312 is provided with a recess 324 which mounts a valve member 325 adapted to be engaged by a workpiece in gauging position to regulate the flow of air through the orifice 322 depending on the size of the workpiece. The valve member 325 is secured to one end of a leaf spring member 326 anchored at its other end to the bar 312 within the recess 324.

As illustrated, the conduit 323 is connected to one end of an air cylinder 328 connected by a line 329 to a source of air under pressure. The cylinder 328 houses a piston 335 biased in opposition to the force of the compressed air by a spring 339. A piston rod 341 is attached to the piston and pivotally connected to a lever 343 pivotally mounted at 349. The piston and cylinder define an expansible chamber which functions as a bellows. The lever is arranged to close contacts 357, 358 and 359, depending on the position of the piston 335 within the cylinder 328. The contacts 357 and 358 are provided respectively in parallel wires 518 and 519, FIG. 22b, and closure of either contacts is adapted to stop the lathe. Contacts 359 are provided in a wire 520 and closure of these contacts is adapted to adjust the stop disc 202.

If the diameter of the finished workpiece in position between the gauging bars is within the limits of a predetermined tolerance, for example, plus or minus .0005" of a desired finish diameter, the position of the valve member 325 is such that the flow of air through the orifice 322 is partially obstructed to provide an air pressure in the cylinder 328 substantially equal to the pressure of the spring 339 and the position of the piston 335 is substantially that shown in FIG. 20. The contacts 357, 358 and 359 are not affected by the lever 343 and the operation of the lathe is unaffected by the gauging operation.

If the diameter of the workpiece in gauging position exceeds the desired finish diameter by, say for example, .0005" to .001", this condition indicates that the tool in work-engaging position is worn beyond the tolerable limit, and the valve member 325 is shifted to obstruct the flow of air through the orifice 322 to a greater degree than before. The pressure in the cylinder 328 increases to shift the lever 343 to close the contacts 359, and the stop disc 202 is indexed to permit the cross-slide to move an increment nearer the axis of the workholder on its next advance.

If the diameter of the workpiece in gauging position exceeds the desired finish diameter by more than .001", this condition may indicate that the tool in work-engaging position is broken, and the valve member 325 will be shifted to substantially close the orifice 322. The air pressure in the cylinder 328 builds up to a value sufficient to shift the lever 343 to close the contacts 358 to ultimately stop the lathe.

If the diameter of the workpiece in gauging position is less than the tolerable finish diameter, this condition may indicate that the tool in work engaging position was improperly set initially, and the valve member 325 will move outwardly to a position in which the flow of air through the orifice 322 is substantially unaffected. The air pressure in the cylinder 328 decreases to a value at which the spring 339 shifts the piston 335 and the lever 343 to close the contacts 357 to ultimately stop the lathe.

Since the closure of contacts 357 or 358 may result from highly irregular conditions, such as, for example, chip material adhering to the workpiece, rather than from the conditions described, it is desirable to provide that the lathe be stopped only after two bad parts are gauged. In this manner, false stoppages may be avoided.

After the gauging mechanism has functioned, fluid is admitted to the cylinder 320 to retract the stop bar 314. Fluid is admitted to the cylinder 320 to extend the stop bar 314 after the limit switch 21LS is actuated by the carriage at the end of its cutting stroke.

Movement of the stop bar 314 controls other functions, and to this end a pin 342, secured to the stop bar, projects upwardly therefrom into engagement with a slot 344 in the end of an arm 346 (FIG. 18) pivoted at 345 on the stop bar housing 347. At the other end of the arm 346, bevelled switch actuating surfaces 348 and 350 are provided to actuate limit switches 1LS and 2LS, respectively. When the stop bar 314 is in its extended position, the surface 348 actuates the limit switch 1LS. When the stop bar 314 is in its retracted position, the surface 350 actuates the limit switch 2LS. The function of these switches is described in connection with the wiring diagram.

*The hydraulic system*

Figure 21:
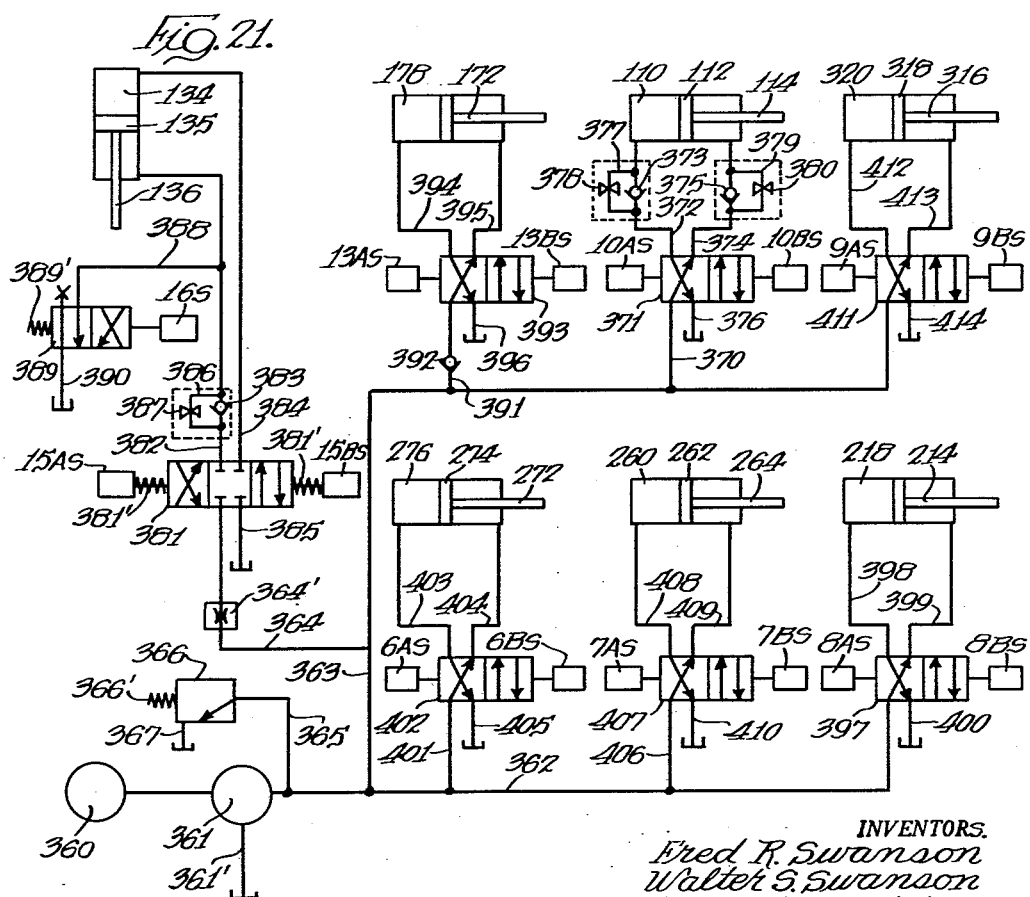
FIG. 21 is a diagrammatic showing of the hydraulic circuit for actuating the various moving parts of the lathe.

Referring now to FIG. 21, the hydraulic system includes an electric motor 360 arranged to drive a pump 361 connected by a line 361' to tank. A line 365 connects the high pressure side of the pump to a relief valve 366 biased to a closed position by a spring 366' and connected by a line 367 to tank.

Fluid is supplied to the cylinder 110 for actuating the loading mechanism from the pump 361 through a line 363, a line 370 and a four-way, two position valve 371 controlled by solenoids 10AS and 10BS. Fluid passes from the valve 371 to the left end of cylinder 110 through a line 372 and a ball check valve 373. The ball check valve is bypassed by a line 377 having a restrictor valve 378 to regulate the speed of movement of the loading arm 96 when fluid is admitted to the right end of cylinder 110. Fluid passes to the right end of cylinder 110 through a line 374 and a ball check valve 375. The ball check valve 375 is bypassed by a line 379 having a restrictor valve 380 to regulate the speed of movement of the loading arm 96 when fluid is admitted to the left end of cylinder 110. A line 376 connects the valve 371 to tank.

The solenoid 10AS is energized to position the valve to connect lines 370 and 374 to admit fluid under pressure to the right end of cylinder 110, and to connect lines 372 and 376 to place the left end of the cylinder in communication with the tank. This solenoid is energized to effect movement of the loading arm 96 to load a rough workpiece when the switch 8LS is actuated by a finished workpiece on reaching the gauging mechanism. The solenoid 10BS is energized to position the valve to connect lines 370 and 372 to admit fluid under pressure to the left end of cylinder 110 and to connect lines 374 and 376 to place the right end of the cylinder in communication with tank. This solenoid is energized to unload a finished workpiece when switch 9LS is actuated on retraction of the tailstock center.

Fluid is supplied to the cylinder 134 for actuating the overhead slide from the pump 361 through a line 364 and a four-way, three-position valve 381 connected to tank by a line 385. Fluid passes from the valve 381 to the upper end of cylinder 134 through a line 384. Fluid passes from the valve to the lower end of cylinder 134 through a line 382 and a ball check valve 383. The ball check valve is bypassed by a line 386 having a restrictor valve 387 to regulate the speed of downward movement of the slide when fluid is admitted to the upper end of the cylinder. The ball check valve 383 and the restrictor valve 387 are by-passed by a line 388 connected to a one-way, two-position valve 389 connected to tank by a line 390.

The valve 389 is biased by a spring 389' to a normal position in which flow through the valve is blocked. Solenoid 16S is energized to shift the valve to connect the lines 388 and 390. The valve 381 is biased by springs 381' and 381" to a central position in which flow through the valve is totally blocked and is shifted to its other two positions by solenoids 15AS and 15BS. The solenoid 15AS is energized to shift the valve 381 to connect lines 364 and 384 and to connect lines 382 and 385. This admits fluid to the upper end of cylinder 134 and connects the lower end of the cylinder to tank. The solenoid 15BS is energized to shift the valve 381 to connect lines 364 and 382 and to connect lines 384 and 385. This admits fluid under pressure to the lower end of cylinder 134 and connects the upper end of the cylinder to tank.

In operation, the solenoids 15AS and 16S are simultaneously energized when the switch 11LS is actuated by the cross slide in its advanced position. This shifts the valve 381 to admit fluid under pressure to the upper end of the cylinder 134 and at the same time shifts the valve 389 to allow fluid to flow freely from the lower end of cylinder 134 so that the overhead slide is advanced rapidly downwardly. When the normally closed switch 4LS is opened by the overhead slide as it moves downwardly, the solenoid 16S is deenergized. This forces the flow of fluid from the lower end of the cylinder 134 through the restrictor valve 387 so that the overhead slide is now moved at a slower feed speed. When the overhead slide reaches its lowest position the limit switch 5LS is actuated, the solenoid 15AS is deenergized and, after a short delay, the solenoid 15BS energized. This admits fluid to the lower end of the cylinder 134 to raise the overhead slide. When the overhead slide reaches its uppermost position the switch 3LS is actuated to deenergize the solenoid 15BS.

Fluid is supplied to the cylinder 178 for actuating the cross-slide from the pump 361 through line 363, a line 391, a ball check valve 392, and a four-way, two-position valve 393 controlled by solenoids 13AS and 13BS. Lines 394 and 395 connect the valve 393 to opposite ends of the cylinder 178 and a line 396 connects the valve to tank. The solenoid 13BS is energized after a gauging operation to position the valve to connect lines 391 and 394 and to connect lines 395 and 396 to move the cross slide inwardly toward the axis of the workholder. The solenoid 13AS is energized when the switch 21LS is closed at the end of the carriage feed stroke to connect lines 391 and 395 and to connect lines 394 and 396 to withdraw the cross slide.

Fluid is admitted to the cylinder 218 for indexing the stop disc 202 from the pump 361 through line 362 and a four-way, two-position valve 397 controlled by solenoids 8AS and 8BS. Lines 398 and 399 connect the valve 397 to opposite ends of the cylinder 218 and a line 400 connects the valve to tank. The solenoid 8BS is energized to position the valve 397 to connect the lines 362 and 398 and to connect the lines 399 and 400 to index the stop disc 202; this occurs after the contacts 359 are closed in response to a determination by the gauging mechanism that the tool in work engaging position is worn. The solenoid 8AS is energized to position the valve 397 to connect lines 362 and 399 and to connect lines 398 and 400 to return the indexing pawl; this occurs after the limit switch 11LS is actuated on advancement of the cross slide.

Fluid is supplied to the cylinder 276 for actuating the tool turret detent plunger 270 from the pump 361 through line 362, a line 401, and a four-way, two-position valve 402 controlled by solenoids 6AS and 6BS. Lines 403 and 404 connect the valve 402 to opposite ends of the cylinder 276 and a line 405 connects the valve to tank. The solenoid 6AS is energized to position the valve to connect the lines 401 and 404 and to connect the lines 403 and 405 to retract the detent plunger 270; this occurs when the limit switch 18LS is actuated after one-half revolution of the stop disc 202. The solenoid 6BS is energized to position the valve to connect lines 401 and 403 and to connect lines 404 and 405 to extend the detent plunger 270; this occurs when the limit switch 13LS is actuated after the tool turret has been indexed.

Fluid passes to the cylinder 260 for indexing the tool turret 20 from the pump 361 through line 362, a line 406, and a four-way, two-position valve 407 controlled by solenoids 7AS and 7BS. Lines 408 and 409 connect the valve 407 to opposite ends of the cylinder 260 and a line 410 connects the valve to tank. The solenoid 7AS is energized to position the valve to connect the lines 406 and 409 and to connect the lines 408 and 410 to index the turret; this occurs when the switch 15LS is actuated on retraction of the detent plunger 270. The solenoid 7BS is energized to shift the valve to connect the lines 406 and 408 and to connect the lines 409 and 410 to return the indexing pawl; this occurs when a switch 16LS is actuated after the detent plunger 270 has been extended to lock the tool turret.

Fluid is supplied to the cylinder 320 for actuating of the stop bar 314 in the gauging mechanism from the pump 361 through line 363 and a four-way, two-position valve 411 controlled by solenoids 9AS and 9BS. Lines 412 and 413 connect the valve 411 to opposite ends of the cylinder 320 and a line 414 connects the valve to tank. The solenoid 9AS is energized to shift the valve to connect the lines 363 and 413 and to connect the lines 412 and 414 to retract the stop bar 314; this occurs after the gauging mechanism has functioned. The solenoid 9BS is energized to shift the valve to connect the lines 412 and 363 and to connect the lines 413 and 414 to extend the stop bar 314; this occurs when switch 21LS is actuated at the end of the carriage stroke.

*The electrical circuit*

Figure 22A:
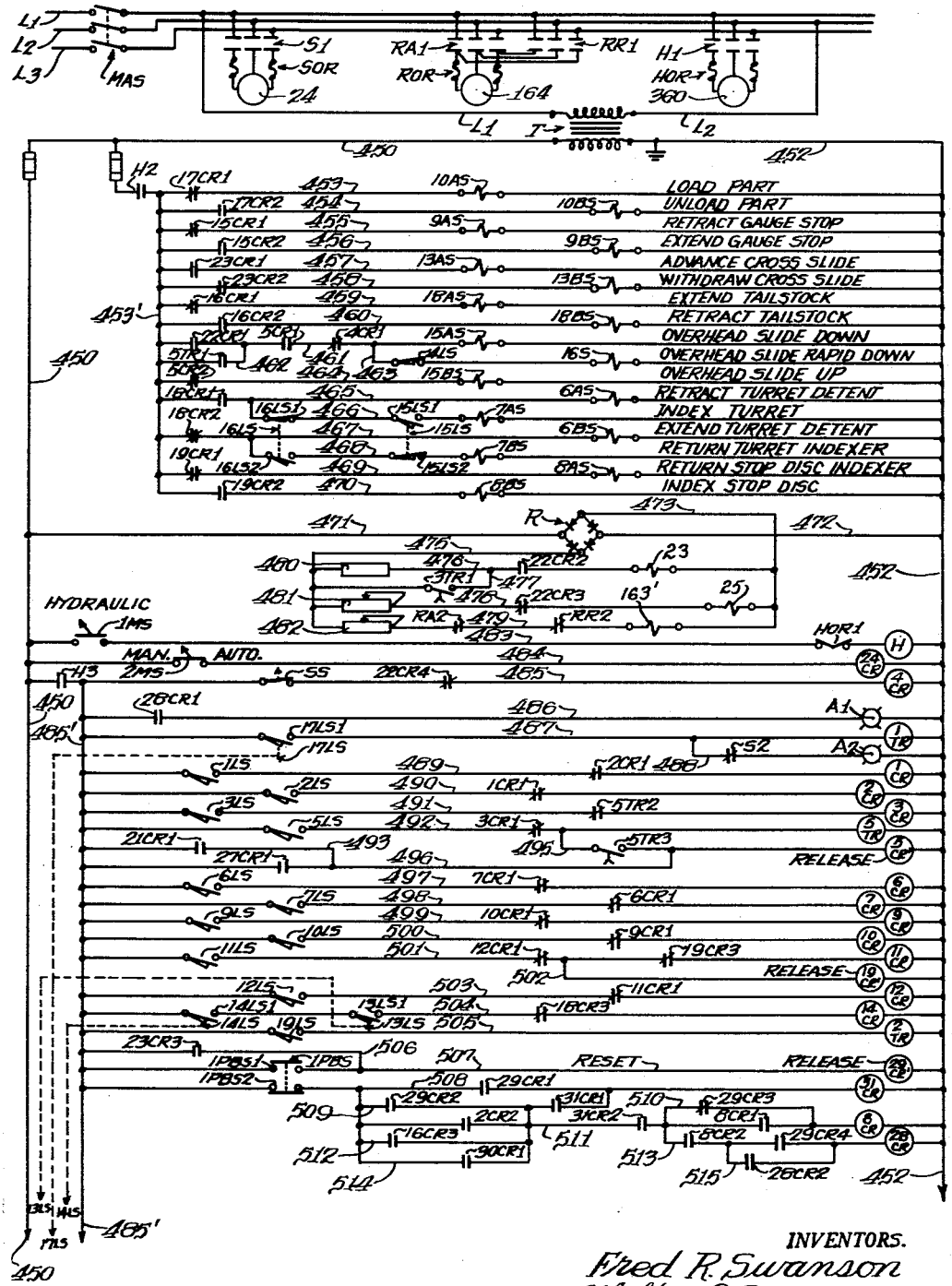
FIG. 22a is a portion of the wiring diagram, which is continued in FIG. 22b.
Figure 22B:
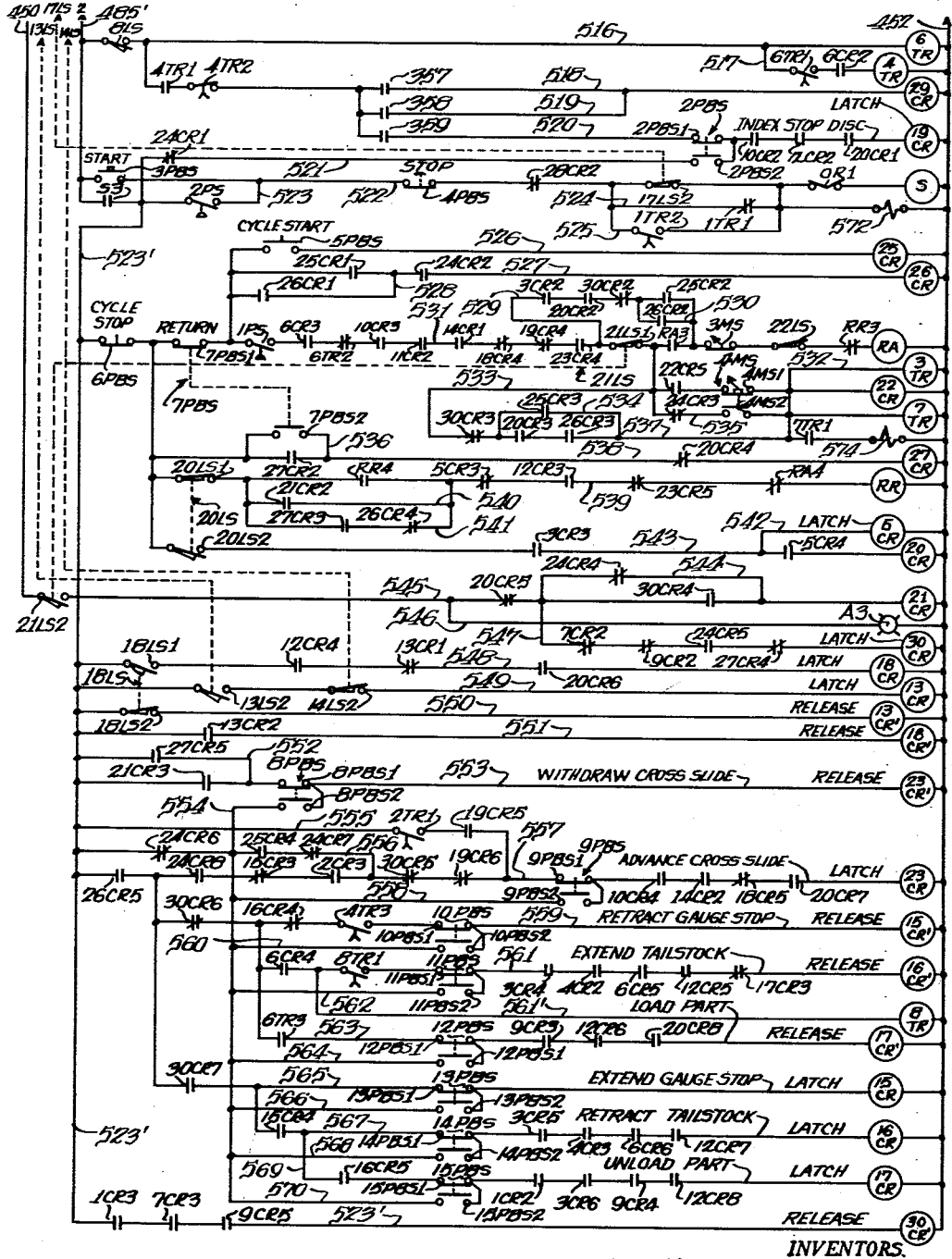

Referring now to FIGURES 22a and 22b, the spindle motor 24, the rapid traverse motor 164, and the hydraulic motor 360 are all connected to a three-phase source of supply indicated by the lines L1, L2 and L3, through the normally open contacts S1, RA1, and RR1, and H1, respectively, and through overload relays SOR, ROR and HOR, respectively. The contacts S1, RA1, RR1, and H1 are controlled respectively by relay coils S in wire 522, RA in wire 531, RR in 539, and H in wire 483 in the control circuit as will be described presently. The relays SOR and ROR each control normally closed contacts indicated as OR1 in the wire 522 in circuit to the relay coil S, so that in response to an overload current in either of the motors 24 or 164, the circuit to the relay coil S will be broken for a purpose that will appear. The overload relay HOR controls normally closed contacts HOR1 in the wire 483 in circuit to the relay coil H so that in response to an overload current in the motor 360, the circuit to the coil H will be broken.

Lines L1 and L2 are connected to the primary of a transformer T and wires 450 and 452 are connected to the secondary of the transformer T. The solenoids 6AS, 6BS, 7AS, 7BS, etc., for controlling the valves in the air circuit and in the hydraulic circuit, are connected across the wires 450 and 452 by means of wires numbered 453 through 470, to be energized automatically in the operation of the lathe.

The spindle clutch coil 23, the spindle brake coil 25, and the rapid traverse brake coil 163' are connected in parallel in a D.C. circuit including a wire 473 and a wire 475 connected to opposite sides of a rectifier R which is supplied by wires 471 and 472 connected across the wires 450 and 452. The spindle clutch coil 23 is connected in a wire 476 connected across the wires 475 and 473 through a resistance 480 and normally open contacts 22CR2. A wire 477 is connected in parallel around the resistance 480 and includes normally open contacts 3TR1 controlled by a timer relay coil 3TR in wire 532. With this arrangement, the contacts 22CR2 are closed on energization of a relay coil 22CR in wire 533 and a circuit is completed through the resistance 480 to the clutch coil 23 to provide a low starting current. The coil 3TR is energized at the same time the coil 22CR is energized and its contacts 3TR1 are closed after a momentary delay to provide the full current to the clutch coil 23. The spindle brake coil 25 is connected in a wire 478 connected across the wires 473 and 475 through a rheostat 481 and normally closed contacts 22CR3 controlled by the relay coil 22CR. The rapid traverse brake coil 163' is connected in a wire 479 connected across the wires 473 and 475 through a rheostat 482 and normally closed contacts RA2 and normally closed contacts RR2. The contacts RA2 and RR2 are controlled by the previously-described relay coils RA and RR, respectively.

The control circuit includes lamps A1 in wire 486, A2 in wire 488, and A3 in wire 546. The lamp A1 is energized when contacts 28CR1 in wire 486 are closed; this occurs when the lathe stops after the gauging mechanism senses a materially oversize or undersize workpiece and closes either of the contacts 357 or 358 in the gauging mechanism. The lamp indicates the reason for the stoppage. Lamp A2 is energized when contacts 17LS in wire 487 are closed and the lathe is stopped after the tool turret has been indexed one complete revolution and all the tools are worn. The lamp indicates the reason for the stoppage. Lamp A3 is energized when contacts 21LS2 in wire 450 are closed at the end of the carriage feed stroke to indicate the end of the stroke.

The control circuit includes a solenoid 572 in wire 524 and a solenoid 574 in wire 537. The solenoid 572 controls a valve (not shown) for supplying lubricant to the mist lubricator 34 in the air circuit for actuating the tailstock center. The solenoid 574 is utilized in controlling a valve (not shown) for supplying lubricant to the guideways for reciprocating parts on the lathe frame.

The control circuit includes the relay coils F, RA, RR, and H, previously referred to, timer relay coils 1TR, 2TR, etc., through 8TR, control relay coils 1CR, 2CR, 3CR, 4CR, 6CR, 7CR, 8CR, 9CR, 10CR, 11CR, 12CR, 14CR, 20CR, 21CR, 22CR, 24CR, 25CR, 26CR, 27CR, 28CR, and 31CR, each of which is associated with a conventional relay in which the contacts controlled thereby are biased in one direction to a normal position when the relay coil is de-energized and are moved to an opposite position when the coil is energized.

The circuit also includes relays in which the contacts are not biased to a normal position but are moved to each position by a separate coil. For example, the latch coil 5CR and the release coil 5CR' are associated with the same relay. In this relay, the release coil 5CR', when energized, moves the contacts associated therewith to a normal position and when the latch coil 5CR is energized, the position of the contacts is reversed. When the latch coil 5CR is de-energized, the switch contacts controlled thereby do not return to the normal position until the release coil 5CR' is energized. Similarly, when the release coil 5CR' is de-energized, the switch contacts remain in the normal position until the latch coil 5CR is energized. The circuit also includes latch coils 15CR, 16CR, 17CR, 18CR, 19CR, 23CR, 29CR, and 30CR and release coils 13CR', 15CR', 16CR', 17CR', 18CR', 19CR', 23CR', 29CR' and 30CR', associated respectively with similar relays.

Figure 23A:
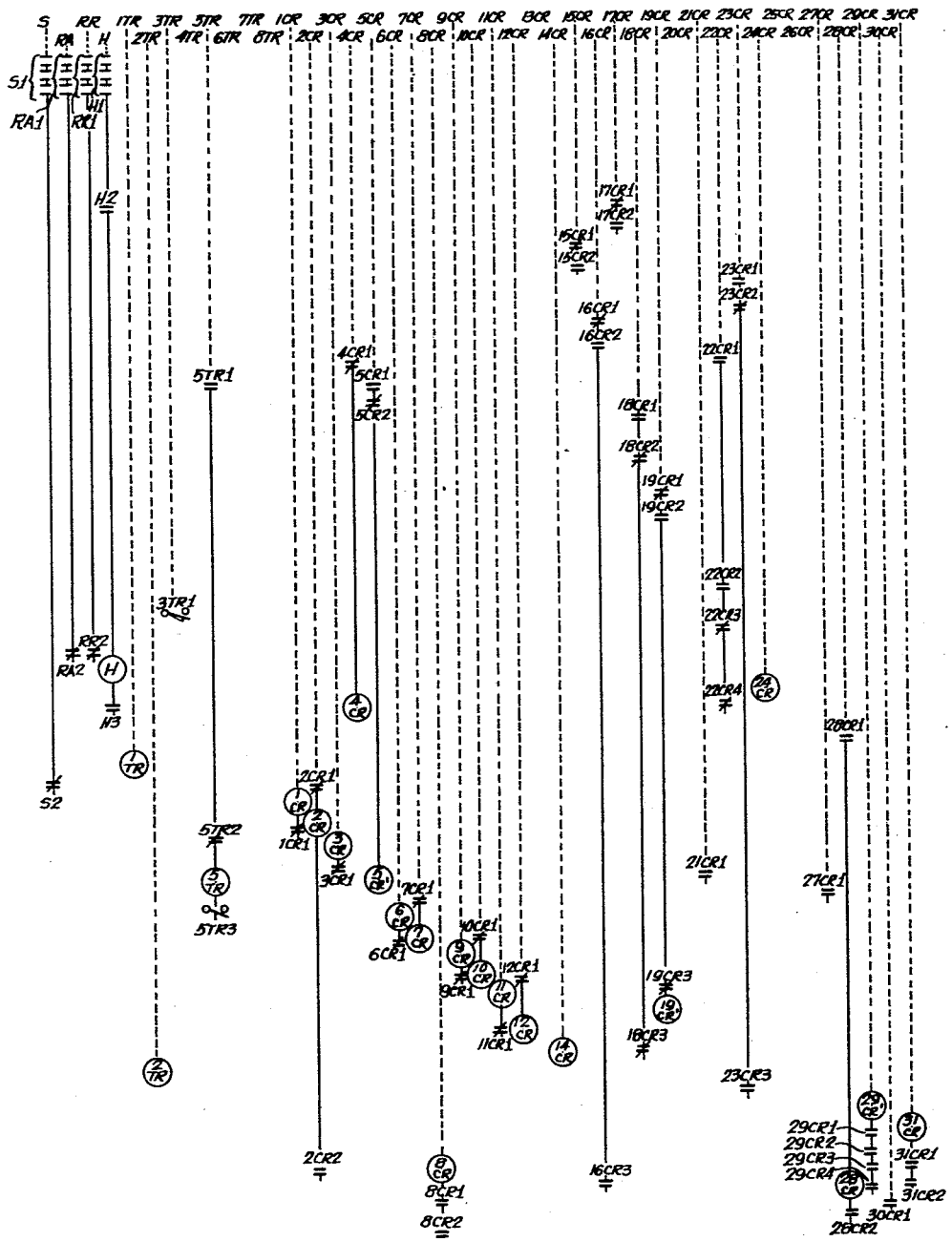
FIG. 23a is a schematic illustration showing the various relays and relay controlled contacts of FIG. 22a; and, FIG. 23b is a schematic illustration showing the various relays and relay controlled contacts of FIG. 22b.
Figure 23F:
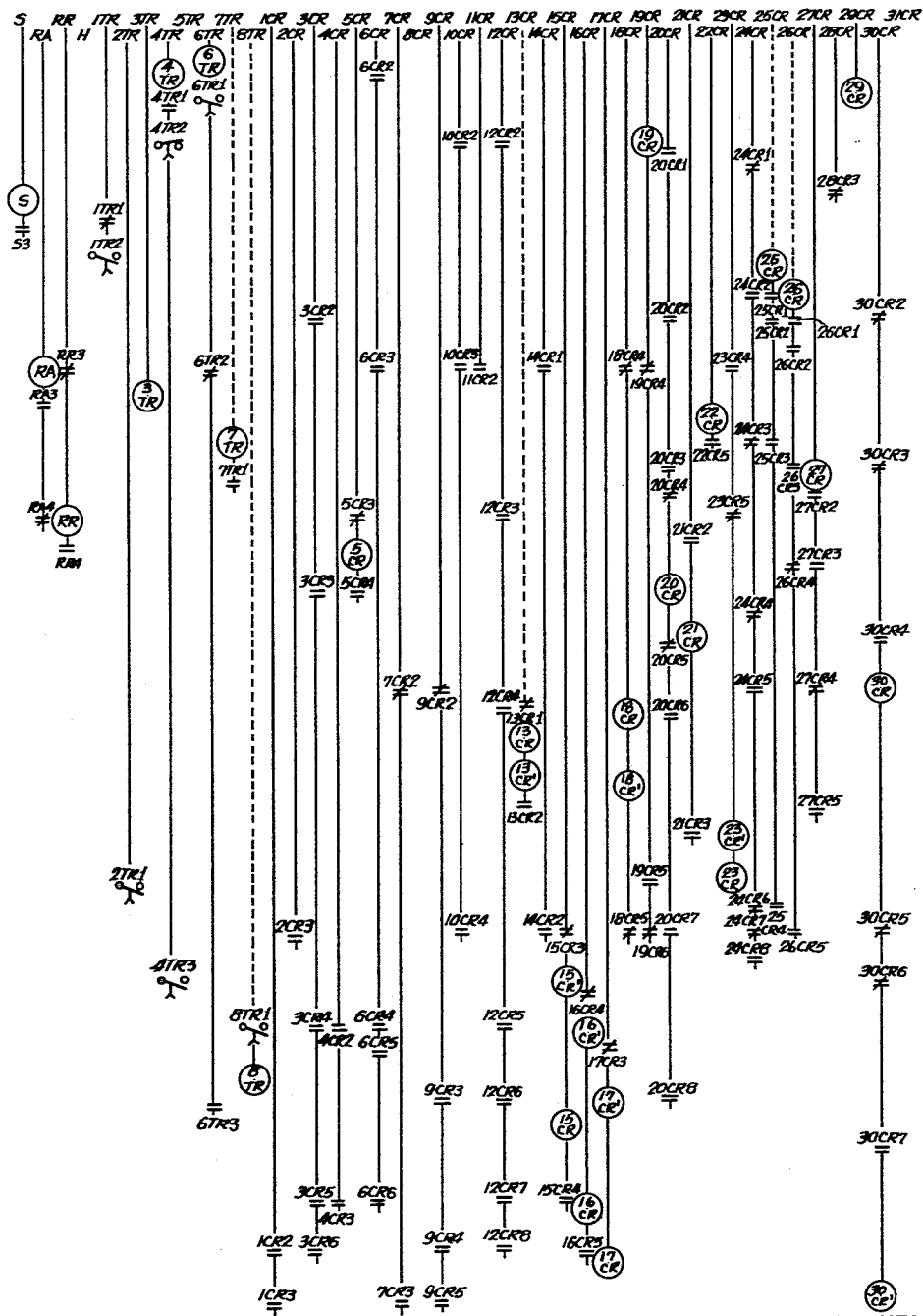

Referring to FIGS. 23a and 23b, these figures indicate schematically the relative location in FIGS. 22a and 22b of all the relay coils included in the control circuit and the contacts controlled thereby. By way of explanation, FIG. 23a should be placed beside FIG. 22a and FIG. 23b should be placed beside FIG. 22b. Now, for example, reading across the top of FIGS. 23a and 23b to S, down the line to the coil S, and left to FIG. 22b, the coil S is found in wire 522. Reading down the line under S again and left to FIGS. 22a and 22b, it is found that the coil S controls normally open contacts S1 in circuit to the motor 24, normally closed contacts S2 in wire 488, and normally open contacts S3 in wire 523. Similarly, reading under 1TR, the timer relay coil 1TR is found in wire 487 and controls normally closed contacts 1TR1 in wire 524, and normally open contacts 1TR2 in wire 525 which have a delayed closing after energization of the coil 1TR. Similarly, reading under 1CR, the control relay coil 1CR is found in the wire 489 and controls normally closed contacts 1CR1 in wire 490, normally open contacts 1CR2 in wire 569, and normally open contacts 1CR3 in wire 523.

The pressure switch 1PS, which is closed by pressure in the line 37 for supplying air under pressure to actuate the tailstock quill, is connected in a wire 531 in circuit to the coil RA. A pressure switch 2PS, not otherwise described, is connected in a wire 523 in circuit to the coil S. This switch is closed by pressure in a line (not shown) for supplying lubricant to the lubricator 34 in the air circuit for actuating the tailstock quill.

The circuit includes a normally open, manually settable, "hydraulic" switch 1MS in wire 483, which must be closed in order to complete a circuit to the relay coil H to energize the hydraulic motor 360.

A normally open, manually settable, "cycle" switch 2MS is connected in wire 484 and must be closed in order to complete a circuit to the relay coil 24CR to provide for automatic operation of the lathe. If automatic operation is not desired, this switch may be left open, and the lathe operated manually.

A manually settable "rapid approach" switch 3MS in wire 531 is normally closed so that the machine is normally operated with a rapid approach movement for the carriage. If rapid approach of the carriage is not desired, this switch may be opened.

A manually settable, "spindle" switch 4MS includes contacts 4MS1 in wire 533 and contacts 4MS2 in wire 535. The switch 4MS is normally set to close the contacts 4MS1 and open the contacts 4MS2 to provide for automatic operation of the spindle. The switch may be set to open the contacts 4MS1 and close the contacts 4MS2 if automatic operation of the spindle is not desired.

The control circuit includes push button switches 1PBS, 2PBS, etc., through 15PBS.

The "reset" push button switch 1PBS includes normally open contacts 1PBS1 in wire 507 and normally closed contacts 1PBS2 in wire 508. This switch may be pressed momentarily to close the contacts 1PBS1 and energize the release coil 29CR' in wire 507. After the coil 29CR in wire 518 has been energized to stop the lathe in response to the closure of contacts 357 or 358 when the gauging mechanism senses a materially oversized or undersized workpiece, the release coil 29CR' must be energized to reset the contacts associated with this coil before automatic operation can be resumed.

The normally open "start" switch 3PBS in wire 522 may be pressed to complete a circuit to the relay coil S in wire 522 to start the spindle motor 24 on beginning operation of the lathe. The normally closed "stop" switch 4PBS in wire 522 may be pressed at any time to break the circuit to the relay coil S and stop the spindle motor 24.

The normally open "cycle start" switch 5PBS in wire 526 is pressed to complete a circuit to relay coil 25CR to initiate automatic operation of the lathe. The normally closed "cycle stop" switch 6PBS in wire 531 may be operated at any time to suspend the automatic operation of the lathe.

The "return" switch 7PBS includes normally closed contacts 7PBS1 in wire 531 and normally open contacts 7PBS2 in wire 536. This switch is pressed to complete a circuit to relay coil 27CR in wire 538. After the switch 6PBS has been employed to stop the lathe, the switch 7PBS may be utilized to return the overhead slide upwardly, to retract the front slide outwardly and to return the carriage and to energize coil 29CR' to reset its contacts, if this is necessary.

The remaining push button switches, 2PBS, 8PBS, etc., through 15PBS, are all utilized in effecting operation of the lathe manually and their functions are set forth hereinafter. It need only be noted at this point that each of the switches includes normally closed contacts PBS1 and normally open contacts PBS2, all of which function in the positions shown during automatic operation of the lathe.

The manually settable, MS switches and the push button, PBS switches are all conveniently located on a control panel 600 (FIG. 2) supported at the front of the lathe on the headstock.

*Automatic operation*

During automatic operation of the lathe, the lathe is stopped after a gauging operation (1) when the gauging mechanism senses a workpiece so materially over-sized or undersized as to indicate that the tool in work engaging position is either broken or wrongly set, or, (2) when the tool turret has been indexed for one complete revolution and all of the tools are worn beyond compensation. Under either of these circumstances, the relative positions of the parts on the lathe are the same after the stoppage. Accordingly, automatic operation of the lathe is normally started at this point and for purposes of describing a cycle of operation hereinafter, the cycle is assumed as starting at this point.

Under these circumstances, the loader arm 96 is in loading position and the limit switch 6LS closed; the positive stop bar in the gauging mechanism is extended and the limit switch 1LS closed; the tailstock quill is extended and the limit switch 10LS closed; the spindle is not rotating and the zero speed switch SS is closed; the overhead slide is up and the limit switch 3LS is closed; the cross slide is withdrawn and the limit switch 12LS is closed; the carriage is at the end of its return stroke and the limit switch 20LS is actuated; the indexing pawl for the positive stop disc is retracted; the indexing pawl for the tool turret is retracted and the limit switch 13LS is actuated; and the detent plunger for the tool turret is extended and limit switch 16LS is actuated.

To begin automatic operation of the lathe, the master switch MAS in the lines L1, L2 and L3 is first closed to provide a power supply to the transformer T. Next the "hydraulic" switch 1MS in wire 483 is closed to energize the coil H. Energization of the coil H closes its contacts H1 in the power supply to the hydraulic motor 360 to energize this motor. Energization of the coil H also closes its contacts H2 in wire 453 to provide a power supply to the solenoids for operating valves in the air and hydraulic circuits. Energization of the coil H also closes its contacts H3 in wire 485 to provide a power supply to the entire control circuit.

The "cycle" switch 2MS in wire 484 is now closed to provide for automatic operation.

If operation of the lathe was previously terminated after the gauging mechanism sensed a workpiece indicating a broken or wrongly set tool, the "reset" switch 1PBS must be depressed to close its contacts 1PBS1 to energize the release coil 29CR' to reset its contacts for automatic operation again.

Next, the "start" switch 3PBS in wire 522 is closed to energize the coil S. If, on beginning operation, the tool turret detent plunger 270 is in engagement with the deep recess 278', the switch 17LS is actuated to close its contacts 17LS1 in wire 487 and to open its contacts 17LS2 in wire 522. Thus, when the contacts H3 in wire 485 are closed, a circuit is completed through the contacts 17LS1 and the wire 487 to energize the coil 1TR. Energization of this coil opens and closes its contacts 1TR2 in wire 525. Thus, the circuit to the coil S is completed through the "start" switch 3PBS, wire 522, wire 525, contacts 1TR2, and the coil S. If, on beginning operation, the switch 17LS is not actuated, its contacts 17LS2 in wire 522 are closed, and the circuit to coil S is completed through these contacts.

On energization of the coil S the oil mist lubrication solenoid 572 in wire 524 is also energized. Thus, when pressure builds up in the line supplying lubricant to the lubricator 34 in the air system for actuating the tailstock, the pressure switch 2PS in wire 523 is closed. On energization of the coil S its contacts S3 in wire 523 are also closed to complete a holding circuit around the start switch 3PBS to maintain the coil energized when the switch 3PBS is opened. Closure of the contacts S3 also completes a circuit through wire 523' to circuits for controlling automatic operation. Energization of the coil S also closes its contacts S1 in the line supply to the spindle motor 24 to start this motor.

Next, the "cycle start" switch 5PBS in wire 526 is depressed to complete a circuit to the coil 25CR. Energization of the coil 25CR closes its contacts 25CR1 in wire 527 to complete a circuit through the now closed contacts 24CR2 to the coil 26CR. Energization of the coil 26CR closes its contacts 26CR1 in wire 528 to complete a holding circuit to the coil 26CR around the contacts 25CR1 which are opened on deenergization of the coil 25CR when the cycle start switch 5PBS is released. Automatic operation of the lathe is now initiated.

Energization of the coil 26CR closes its contacts 26CR5 in wire 557 to complete a circuit to the release coil 15CR' in wire 559 which then closes its contacts 15CR1 in wire 455 to energize the solenoid 9AS which retracts the positive stop bar 314 in the gauging mechanism. Retraction of the stop bar 314 permits the workpiece to roll out of the gauging mechanism and the limit switch 8LS in wire 516 is opened, thus deenergizing the coils 6TR and 4TR.

Energization of the release coil 15CR' closes its contacts 15CR3 in wire 557; and on retraction of the stop bar 314 in the gauging mechanism, the limit switch 2LS in wire 490 is closed to energize the coil 2CR which closes its contacts 2CR3 in wire 557, so that a circuit is completed to the latch coil 23CR. Energization of the latch coil 23CR closes its contacts 23CR1 in wire 457 to energize the solenoid 13AS which advances the cross slide toward the axis of the workholder.

Energization of the latch coil 23CR closes its contacts 23CR4 in wire 531; on advancement of the cross slide toward the axis of the workholder the limit switch 11LS in wire 501 is closed to energize the coil 11CR and close its contacts 11CR2 in wire 531. A circuit is thus completed through the wire 531, the wire 533, the wire 537, to the coil 22CR. Energization of the coil 22CR closes its contacts 22CR2 in wire 476 to energize the spindle clutch coil 23; energization of the coil 22CR also opens its contacts 22CR3 in wire 478 to deenergize the spindle brake coil 25. Energization of the spindle clutch coil 23 through the wire 476 and resistance 480 provides a slow starting current. On energization of the relay coil 22CR, the timer relay coil 3TR in wire 532 is also energized and after a short delay closes its contacts 3TR1 in wire 477 to by-pass the resistance 480 and provide the full current to the clutch coil 23. At the same time the coil 22CR is energized, the timer coil 7TR in wire 535 is also energized and closes its contacts 7TR1 in wire 537 to energize the solenoid 574 which controls a valve providing lubricant to the reciprocating guideways.

At the time the contacts 11CR2 and the contacts 23CR4 in wire 531 are closed as set forth above, a circuit is also completed through the wire 531, wire 529, the wire 530, the switch 3MS, the switch 22LS and contacts RR3 to energize the relay coil RA. Energization of the coil RA closes its contacts RA1 in the line supplied to the rapid traverse motor 164 to energize this motor; energization of the coil RA also opens its contacts RA2 in wire 479 to deenergize the rapid traverse brake coil 163'. This results in movement of the carriage at a rapid approach speed. Energization of the coil RA also closes its contacts RA3 in wire 531 to complete a holding circuit to the coil RA; this is necessary since the contacts 20LS2 in wire 543 are opened at the beginning of carriage movement resulting in deenergization of the coil 20CR and opening of its contacts 20CR2 in wire 529.

When the coil 22CR is energized it closes its contacts 22CR1 in wire 461; and when the spindle starts rotating the zero speed switch SS in wire 485 is opened to deenergize the coil 4CR which then closes its contacts 4CR1 in wire 461. In this manner the circuit is completed to the solenoid 15AS which initiates movement of the overhead slide rapidly downwardly. Solenoid 16S in wire 463 is also energized at this time.

The overhead slide moves rapidly downwardly until the switch 4LS in wire 463 is opened, deenergizing the solenoid 16S. Thereafter the slide continues downwardly at a slower speed, as explained in connection with the description of the hydraulic circuit, continuing downwardly until the limit switch 5LS is actuated. When the switch 5LS is closed a circuit is completed through wire 492 to energize the timer relay coil 5TR. After a short delay the contacts 5TR3 in wire 495 are closed to energize the release coil 5CR', the latch coil 5CR in wire 542 now being de-energized since the contacts 20LS2 in wire 543 are opened when carriage movement begins. Energization of the release coil 5CR' opens its contacts 5CR1 in wire 461 to deenergize the solenoid 15AS. Energization of the coil 5CR' also closes its contacts 5CR2 in wire 464 to energize the solenoid 15BS which initiates return movement of the overhead slide upwardly. The slide returns to its initial position, opening the limit switch 5LS at the beginning of the movement, thus deenergizing the release coil 5CR'; deenergization of the coil 5CR' does not open the contacts 5CR2 since these contacts remain closed until the latch coil 5CR is again energized. Movement of the overhead slide to its initial position closes the limit switch 3LS in wire 491 to energize the coil 3CR.

During the rapid approach movement of the carriage the dog 195 moves to a position to open the limit switch 22LS in wire 531 to deenergize the coil RA. Deenergization of the coil RA opens the contacts RA1 in the line to the rapid traverse motor 164 to deenergize this motor. Deenergization of the coil RA also results in the closure of its contacts RA2 in wire 479 to energize the rapid traverse brake coil 163'. Thereafter carriage movement continues at the slower forward feed speed.

At the end of the feed stroke of the carriage the dog 193 moves to a position to actuate the limit switch 21LS. Actuation of the limit switch 21LS opens its contacts 21LS1 in wire 531 and closes its contacts 21LS2 in wire 545. When the contacts 21LS1 are opened, the circuit to the relay coil 22CR in wire 533 is broken. Deenergization of the relay coil 22CR opens its contacts 22CR2 in wire 476 to deenergize the spindle clutch coil 23; energization of the coil 22CR also closes its contacts 22CR3 in wire 478 to energize the spindle brake coil 25. This results in stopping the spindle.

Closure of the contacts 21LS2 in wire 545 completes a circuit through wire 546 to light the lamp A3 to indicate the end of the feed movement. Closure of the contacts 21LS2 also completes a circuit through wire 545 and wire 547 to energize the latch coil 30CR. Energization of the latch coil 30CR closes its contacts 30CR4 in wire 545 to complete a circuit to the coil 21CR. Energization of the coil 21CR closes its contacts 21CR3 in wire 553 to energize the release coil 23CR' which then closes its contacts 23CR2 in wire 458 to energize the solenoid 13BS which initiates withdrawal of the cross slide.

Energization of the coil 21CR also closes its contacts 21CR2 in wire 540. Energization of the release coil 23CR' closes its contacts 23CR5 in wire 539. Withdrawal of the cross slide away from the spindle axis results in closure of the switch 12LS in wire 503 which completes a circuit to energize the coil 12CR and close its contacts 12CR3 in wire 539. In this manner a circuit is completed through the wire 539 to energize the rapid return coil RR.

Energization of the coil RR closes its contacts RR1 in circuit to the rapid traverse motor 164 to energize this motor; energization of the coil RR also opens its contacts RR2 in wire 479 to deenergize the rapid traverse brake coil 163'. Energization of the coil RR also closes its contacts RR4 in wire 539 to complete a holding circuit to the coil around the contacts 21CR2 in wire 540 which will be opened on deenergization of the coil 21CR as soon as carriage return movement begins and dog 193 clears the limit switch 21LS and permits its contacts 21LS2 in wire 545 to open. Return movement of the carriage continues until the dog 191 returns to its initial position to actuate the switch 20LS, opening its contacts 20LS1 in wire 539 to deenergize the rapid return coil RR.

Energization of the latch coil 30CR in wire 547 to initiate return movement of the carriage also closes its contacts 30CR7 in wire 565 to complete the circuit to the latch coil 15CR which then closes its contacts 15CR2 in wire 456 to advance the positive stop bar 314 in the gauging mechanism.

Energization of the latch coil 15CR closes its contacts 15CR4 in wire 567; when the cross slide is withdrawn the limit switch 12LS in wire 503 is closed to energize the coil 12CR which closes its contacts 12CR7 in wire 567; and when the spindle stops rotating the zero speed switch SS in wire 485 is closed to energize the coil 4CR which closes its contacts 4CR3 in wire 567. In this manner, a circuit is completed to the latch coil 16CR which then closes its contacts 16CR2 in wire 460 to energize the solenoid 18BS which initiates withdrawal of the tail stock quill to leave the finished work piece in the loading arm.

Energization of the latch coil 16CR closes its contacts 16CR5 in wire 569; extension of the positive stop bar in the gauging mechanism closes the limit switch 1LS in wire 489, energizing the coil 1CR and closing its contacts 1CR2 in wire 569; thus when the tail stock quill is retracted, closing the limit switch 9LS a circuit is completed to the coil 9CR, closing its contacts 9CR4 in the wire 569 and completing a circuit to the latch coil 17CR. Energization of the coil 17CR closes its contacts 7CR2 in wire 454 to energize the solenoid 10BS to initiate movement of the loading arm to unload the finished work piece and deliver it to the gauging mechanism.

On reaching the gauging mechanism, the finished workpiece closes the limit switch 8LS in wire 516 to energize the coil 6TR. Energization of the coil 6TR immediately closes its contacts 6TR3 in wire 563 to energize the release coil 17CR'. Energization of the release coil 17CR' closes its contact 17CR1 in wire 453 to energize the solenoid 10AS which effects movement of the loading arm 96 to load another rough work piece in position for pick-up by the tailstock center and work holder.

Energization of the release coil 17CR' also closes its contacts 17CR3 in wire 561 in circuit to release coil 16CR'. When the loading arm 96 moves, the dog 122 clears the switch 7LS in wire 498 which then opens to deenergize the coil 7CR and close its contacts 7CR1 in wire 497. When the arm 96 places a rough work piece in position for pick up by the tailstock center, dog 120 closes the limit switch 6LS in wire 497, energizing the coil 6CR which then closes its contacts 6CR4 and 6CR5 in wire 561. Closure of the contact 6CR4 completes a circuit through wire 561' to the timer relay coil 8TR. After a short delay the coil 8TR closes its contacts 8TR1 in wire 61 to complete a circuit to the release coil 16CR' which then closes its contact 16CR1 in wire 459 to complete a circuit to the solenoid 18AS which effects movement of the tailstock quill toward the head stock to clamp the workpiece for rotation with the spindle.

Energization of the coil 6CR in wire 497 closes its contacts 6CR2 in wire 517 in circuit to the timer relay coil 4TR, and a short time, say, for example, about two seconds, after the coil 6TR is energized, its contacts 6TR1 in wire 517 are also closed, thus completing a circuit to energize the coil 4TR. Energization of the coil 4TR may (1) effect continued automatic operation of the lathe if the gauging mechanism senses no condition requiring stoppage or adjustment, or (2) permit the gauging mechanism to effect stoppage of the lathe if it senses a workpiece so materially oversized or undersized as to indicate a broken or wrongly set tool, or (3) permit the gauging mechanism to effect indexing of the stop disc 202 if it senses a workpiece which indicates a worn tool. Note that the third function may effect stoppage of the lathe when the tool turret is indexed one complete revolution and all tools are worn beyond compensation.

Firstly, if the workpiece in gauging position is within tolerable limits, that is, for example within ±.0005" of the desired finish diameter, none of the contacts 357, 358 or 359 in the gauging mechanism will be closed; the gauging mechanism will not alter the operation of the lathe and the second cycle of automatic operation will continue after the delay provided to permit the gauging mechanism to function. Thus, a short time, say, for example, about one second, after the coil 4TR is energized its contacts 4TR3 in wire 559 will be closed to complete a circuit to the release coil 15CR′ in wire 559. Energization of the coil 15CR′ closes its contacts 15CR1 in wire 455 to energize the solenoid 9AS which retracts the positive stop 314 in the gauging mechanism, and automatic operation continues as described above. Note that the combined delay in the closing of contacts 6TR1 in wire 517 and contacts 4TR3 in wire 559 provide about three seconds, for example, for the gauging mechanism to function after the workpiece reaches the gauging mechanism and before the second cycle of operation is begun by retraction of the stop bar 314 in the gauging mechanism.

Secondly, if the gauging mechanism senses a workpiece having a diameter, more than .001", for example, over the desired finish diameter, or a diameter smaller than .0005", for example, under the desired finish diameter, the piston 335 in the gauging mechanism will be shifted to close either the contacts 358 in wire 519 or the contacts 357 in wire 518 to stop the lathe. Thus, when the relay 4TR in wire 517 is energized, the contacts 4TR1 in wire 518 are immediately closed, and if either of the contacts 357 or 358 is closed, a circuit is completed to energize the latch coil 29 in wire 518 which is effective to stop the lathe. The contacts 4TR2 in wire 518 are opened about one second, for example, after the coil 4TR is energized. Thus, after the workpiece reaches the gauging mechanism, a delay of about three seconds is provided by the delayed closing of contacts 6TR1 and the delayed opening of contacts 4TR2, during which the gauging mechanism may function to close one set of contacts to initiate stoppage or corrective action. As explained above, after the workpiece reaches the gauging mechanism, a delay of about three seconds is also provided by the delayed closing of contacts 6TR1 and 4TR3, before the second cycle is begun by retracting the stop bar 314 in the gauging mechanism. This latter delay allows the gauging mechanism to effect stoppage or correction before the second cycle is begun.

Since the closure of contacts 357 or 358 may result from highly irregular conditions, as previously described, rather than as a result of a wrongly set or broken tool, energization of the coil 29CR is effective to stop the lathe only after two bad parts have been gauged.

Thus, on the first energization of the coil 29CR the contacts 29CR1 in wire 508 are closed to energize the coil 31CR. Energization of the coil 29CR also closes the contacts 29CR2 in wire 509 and opens the contacts 29CR3 in wire 510. Energization of the coil 31CR closes the contacts 31CR1 in wire 509 and closes the contacts 31CR2 in wire 511 in circuit to the coil 8CR. But since the contacts 29CR3 in wire 510 are open, the coil 8CR is not energized at this time, the contacts 8CR2 in wire 513 remain open, and the coil 28CR which must be energized to stop the lathe is not energized. Instead, when the contacts 4TR3 in wire 559 close, the coil 15CR′ is energized to retract the positive stop bar 314, and automatic operation continues as described above.

On retraction of the stop bar 314, the switch 2LS in wire 490 is closed, energizing the coil 2CR and closing the contacts 2CR2 in wire 511. When the coil 23CR is energized to advance the cross-slide, the contacts 23CR3 in wire 506 are closed to energize the release coil 29CR′ in wire 507. While this opens the contacts 29CR2 in wire 509, the coil 31CR remains energized through the contacts 2CR2 and 31CR1. The contacts 31CR2 in wire 511 remain closed and on energizing the coil 29CR′ the contacts 29CR3 close to energize the coil 8CR, closing the contacts 8CR1 and 8CR2 in wires 511 and 513. The coils 31CR and 8CR remain energized through contacts 2CR2 in wire 511, the contacts 16CR3 in wire 512. and the contacts 30CR1 in wire 514. If the next workpiece gauged is effective to energize the coil 29CR again, the contacts 29CR4 in wire 513 are closed, energizing the coil 28CR in wire 513.

Energization of the coil 28CR opens its contacts 28CR3 in wire 522 to break the circuit to the relay coil S. De-energization of the coil S opens its contacts S1 in circuit to the spindle motor 24 to deenergize this motor. De-energization of the coil S also opens its contacts S3 in wire 523 to break the circuit through wire 523′ controlling the automatic operation of the lathe, and the lathe is stopped before the contacts 4TR3 in wire 559 are closed to initiate the second cycle. Energization of the coil 28CR also closes its contacts 28CR1 in wire 486 to light the lamp A1 to indicate the reason for the stoppage.

It may be desirable to provide for stopping the lathe after only one bad workpiece is gauged, instead of after two bad pieces are gauged. If operation in this manner is desired, it is provided simply by eliminating the coils 31CR and 8CR and the wires 509, 510, etc. through 515, and connecting the coil 28CR in wire 508. Thus, on each energization of the coil 29CR, the contacts 29CR1 in wire 508 would be closed to energize the coil 28CR and stop the lathe.

Thirdly, if the diameter of the workpiece in gauging position exceeds the desired finish diameter by from .0005" to .001", indicating that the tool in work-engaging position is worn to the tolerable limit, the piston 335 in the gauging mechanism will be shifted to close the contacts 359 in wire 520 to compensate for tool wear. When the contacts 359 are closed, a circuit is completed through the contacts 4TR1, 4TR2, and wire 520 to energize the latch coil 19CR. Energization of the latch coil 19CR closes its contacts 19CR2 in wire 470 to energize the solenoid 8BS which indexes the stop disc 202 to permit the cross-slide to move an increment nearer the workpiece on its next advance to compensate for tool wear.

When the disc 202 is indexed, the limit switch 19LS in wire 505 is closed to complete a circuit to the timer relay coil 2TR. After a short delay the contacts 2TR1 in wire 555 are closed; the contacts 19CR5 in wire 555 were previously closed on energization of the latch coil 19CR. The contacts 10CR4 in wire 557 are closed when the tailstock quill is advanced as described hereinabove, closing the switch 10LS in wire 500 and energizing coil 10CR. In this manner a circuit is completed to the latch coil 23CR through wire 555 to effect advancement of the cross slide; energization of the latch coil 19CR opened its contacts 19CR6 in wire 557 so that energization of the latch coil 23CR is not in this instance effected directly through wire 557 as before, but now depends on the delayed closing of contacts 2TR1. The delayed closing of contacts 2TR1 provides a short period of time during which the stop disc 202 may be indexed and during which the tool turret may be indexed, if necessary, before the cross slide is advanced.

Thus, when the contacts 2TR1 close, and the tailstock quill is advanced, the latch coil 23CR is energized and its contacts 23CR1 in wire 457 are closed to energize the the solenoid 13AS to advance the front slide. On advancement of the front slide the switch 11LS in wire 501 is closed and automatic operation continues as before.

On indexing the stop disc 202 for the sixth time, the particular tool in work engaging position is worn beyond compensation, and limit switch 18LS is actuated by the pin 205 on disc 202, closing its contacts 18LS1 in wire 548 and energizing the latch coil 18CR to effect indexing of the turret 20. Energization of the coil 18CR closes its contacts 18CR1 in wire 465 to energize the solenoid 6AS to retract the detent plunger 270 for the tool turret 20. On retraction of the detent plunger 270, the limit switch 16LS returns to its normal position and the switch 15LS is actuated; thus closing the contacts 16LS1 and 15LS1 in the wire 466. This results in energizing the solenoid 7AS to index the tool turret to position a new tool to engage the workpiece. On indexing the tool turret, the limit switch 13LS is actuated to close its contacts 13LS2 in wire 549; at the same time the limit switch 14LS returns to its normal position, closing its contacts 14LS2 in wire 549. This completes a circuit to the latch coil 13CR. Energization of the latch coil 13CR closes its contacts 13CR2 in wire 551, energizing the release coil 18CR' which then closes its contacts 18CR2 in wire 467 to energize the solenoid 6BS which returns the detent plunger 270. On returning the detent plunger 270, the limit switch 16LS is actuated to close its contacts 16LS2 in wire 468; at the same time the switch 15LS returns to its normal position, closing its contacts 15LS2 in wire 468. This completes a circuit to the solenoid 7BS to return the tool turret indexing pawl. On returning the tool turret indexing pawl the switch 14LS is actuated to close its contacts 14LS1 in wire 504; at the same time the limit switch 13LS returns to its normal position, closing its contacts 13LS1 in wire 504. A circuit is thus completed to energize the coil 14CR. Energization of the coil 14CR closes its contacts 14CR2 in wire 557, and when the contacts 2TR1 in wire 555 and contacts 10CR4 in wire 557 are closed, the cross slide is advanced, and automatic operation continues as described before.

When the tool turret is indexed one complete revolution, indicating that all tools are worn, the detent plunger 270, on returning to its position, engages the deep recess 278' and moves to a position to actuate the limit switch 17LS. Actuation of the limit switch 17LS opens its contacts 17LS2 in wire 522 to break the circuit to the spindle relay S, which stops all operation. Actuation of the switch 17LS also closes its contacts 17LS1 in wire 487 to light the lamp A2 to indicate the reason for the stoppage.

*Manual operation*

Under some circumstances it may be desirable to operate the lathe manually, that is, it may be desirable to effect the various steps individually under manual control. If this is so, the first notable distinction over automatic operation is that the manually settable "cycle" switch 2MS in wire 484 is not closed so that the coil 24CR is not energized and its contacts remain in their normal position throughout the manual operation of the lathe.

To begin operation of the lathe, the master switch MAS is closed as in automatic operation. Next, the "hydraulic" switch 1MS in wire 483 is closed and functions as in automatic operation. The "spindle" switch 4MS must be set to close its contacts 4MS2 in wire 535. Next, if necessary, the "reset" switch 1PBS must be depressed to energize the release coil 29CR' in wire 507 to reset its contacts as described in automatic operation.

Now, the "start" switch 3PBS in wire 522 is closed to energize the coil S which functions in the same manner as in automatic operation.

Since automatic operation is not now contemplated, the "cycle start" switch 5PBS in wire 526 is not depressed and neither of the coils 25CR or 26CR in wires 526 and 527 is energized.

Assuming the various parts on the lathe are in the same positions as described on initiating automatic operation, the first step now is to retract the positive stop bar 314 in the gauging mechanism. In order to do this, the push button switch 10PBS is depressed to close its contacts 10PBS2 in wire 560, completing a circuit through the wire 523', the wire 555, normally closed contacts 24CR6, wire 555, wire 560, and wire 559 to energize the coil 15CR' which functions in the same manner as in automatic operation to retract the stop bar 314.

In order to advance the cross slide toward the axis of the work piece, the switch 9PBS is depressed to close its contacts 9PBS2 in wire 558, completing a circuit through the contacts 24CR6, the wire 554, the wire 558 and the wire 557 to energize the latch coil 23CR which functions to advance the cross slide in the same manner as in automatic operation.

On advancement of the cross slide, the limit switch 11LS in wire 501 is closed, energizing the coil 11CR which then closes its contacts 11CR2 in wire 531, completing a circuit through the wire 531, the wire 535 and the now closed contacts 4MS2 to energize the coil 22CR. Energization of the coil 22CR functions as in automatic operation to energize the spindle clutch coil and to initiate the cycling of the overhead slide.

As in automatic operation, energization of the clutch coil 23 also initiates movement of the carriage at its slow forward speed. Note, however, that since neither of the contacts 25CR2 in wire 529 nor the contacts 26CR2 in wire 530 are closed, no circuit is completed to the rapid approach coil RA in wire 531. Thus, the carriage is not advanced at its rapid approach speed.

At the end of the carriage feed stroke, the limit switch 21LS is actuated and functions as in automatic operation to interrupt the drive to the spindle.

In order to withdraw the cross slide, the switch 8PBS is depressed to close its contacts 8PBS2 in wire 545, completing a circuit through the contacts 24CR6, the contacts 8PBS2 and wire 553 to energize the release coil 23CR' which functions as in automatic operation to withdraw the cross slide.

Actuation of the limit switch 21LS closes its contacts 21LS2 in wire 545 to complete a circuit through wire 544 to energize the coil 21CR, which then closes its contacts 21CR2 in wire 540. On withdrawal of the cross slide, the switch 12LS in wire 503 is closed and closes its contacts 12CR3 in wire 539, thus completing a circuit to the rapid return coil RR which then functions to return the carriage to its original position.

In order to extend the positive stop bar 314 in the gauging mechanism, the switch 12PBS is depressed to close its contacts 13PBS2 in wire 566, completing a circuit to the latch coil 15CR which then functions as in automatic operation.

When the cross slide is withdrawn, the switch 12LS in wire 503 is closed, energizing the coil 12CR and closing its contacts 12CR7 in wire 567. When the spindle stops rotating, the zero speed switch SS in wire 485 is closed, energizing the coil 4CR and closing its contact 4CR3 in wire 567. At this time, in order to retract the tailstock, the switch 14PBS is depressed to close its contact 14PBS2 in wire 568, thus completing the circuit to the latch coil 16CR which functions as in automatic operation to retract the tailstock.

When the tailstock is retracted, the switch 9LS in wire 499 is closed, energizing the coil 9CR and closing its contacts 9CR4 in wire 569. At this time, in order to unload the finished work piece, the switch 15PBS is depressed to close its contact 15PBS2 to energize the latch coil 17CR which then functions as in automatic operation.

In order to load a new work piece, the switch 12PBS is depressed to close its contact 12PBS2 in wire 564 to complete a circuit to the release coil 17CR' which then functions to load a new work piece as in automatic operation.

On loading a new work piece, the switch 6LS in wire 497 is closed, energizing the coil 6CR and closing its contacts 6CR5 in wire 561. Energization of the release coil 17CR' closes its contacts 17CR3 in wire 561. At this time, the switch 11PBS may be depressed, closing its contacts 11PBS2 in wire 562 to complete a circuit to release coil 16CR' which then functions as in automatic operation to extend the tailstock quill.

On reaching the gauging mechanism, the finished work piece closes the limit switch 8LS in wire 516, energizing the coil 6TR, and after about two seconds, closing its contacts 6TR1 in wire 517. On energization of the coil 6CR when the loading arm loads a new work piece, its contacts 6TR2 in wire 517 are closed to complete a circuit to the coil 4TR. The coil 4TR immediately closes its contacts 4TR1 in wire 518, and after about one second, opens its contacts 4TR2 in wire 518. During the period after the contacts 4TR1 are closed and before the contacts 4TR2 are opened, the gauging mechanism is free to function as in automatic operation. Thus, if the finished workpiece indicates that no compensation or stoppage is required, the gauging mechanism will in no way affect the lathe. If, however, either of the contacts 357 or 358 are closed, the latch coil 29CR will be energized to stop the lathe as in automatic operation. If the gauging mechanism closes the contacts 359, a circuit will be completed to energize the coil 19CR to index the stop disc 202 as in automatic operation, and ultimately, if necessary, index the tool turret.

Note that the coil 19CR may be energized under manual control to index the stop disc if this is found necessary. Thus, if the switch 2PBS is depresssed to close its contacts 2PBS2 in wire 521, a circuit is completed in this manner to the coil 19CR.

We claim:

1. A lathe comprising a headstock, a rotary work supporting spindle mounted in the headstock, a carriage movable longitudinally of the spindle axis, a tool slide movable on the carriage transversely of the spindle axis, adjustable stop means for limiting movement of the slide toward the spindle axis, a tool supporting turret rotatably mounted on the slide, a plurality of similar sets of cutting tools spaced on the periphery of said turret, said turret being mounted to be indexed to present successive sets of cutting tools to a work engaging position, each of said sets comprising a roughing tool and a finishing tool, gauging means for detecting whether the tip of the finishing tool in work engaging position projects toward the spindle axis to a position within predetermined limits of tolerance so as to detect tool wear, means responsive to said gauging means when said finishing tool is worn to the predetermined limit for adjusting said stop means to compensate for the tool wear, and means responsive to said stop means after a predetermined maximum adjustment for indexing said turret to present a succeeding set of tools to the work engaging position.

2. A lathe comprising a rotary work supporting means, a carriage movable longitudinally of the axis of the work supporting means, a tool slide movable on the carriage transversely of the axis of the work supporting means, a tool support rotatably mounted on the slide, a plurality of similar cutting tools circumferentially spaced on the support, said tool support being mounted to be indexed to present successive cutting tools to a work engaging position, gauging means for detecting whether the tip of a cutting tool in work engaging position projects toward the axis of said work supporting means to a position within predetermined limits of tolerance so as to detect tool wear, and means responsive to said gauging means when the tool in work engaging position is worn to the predetermined limit, for indexing said tool support to present a succeeding tool to the work engaging position.

3. A lathe comprising a rotary work support, a carriage movable longitudinally of the axis of the work support, a tool slide mounted on the carriage for movement toward and away from the axis of the work support means for moving the tool slide on the carriage, adjustable stop means for limiting movement of the slide toward the axis of the work support, a tool supporting turret rotatably mounted on the slide, a plurality of identical cutting tools spaced on the periphery of the turret, means for adjusting said stop means to compensate for tool wear within a predetermined compensable limit, and means controlled by said stop means for indexing said turret to present successive tools to a work engaging position when preceding tools are worn beyond the predetermined compensable limit.

4. A lathe comprising a headstock, a rotary work supporting spindle mounted in the headstock, a tailstock, a center mounted in the tailstock for movement toward the headstock to clamp a workpiece to the spindle, mechanism for loading a workpiece into position for pickup by said center and spindle, a bed, a carriage mounted on the bed for movement longitudinally of the spindle axis, a tool slide mounted on the carriage for movement toward and away from the spindle axis, adjustable stop means for limiting movement of the slide toward the spindle axis, a tool turret rotatably mounted on the tool slide, a plurality of similar cutting tools equally spaced on the periphery of said turret, said turret being indexible to present successive cutting tools thereon to a work engaging position, means for gauging a finished workpiece to determine whether the finished diameter is within predetermined limits of tolerance, said loading mechanism being actuable to unload a finished workpiece and deliver it to the gauging mechanism, means actuated by said gauging means when the diameter of the finished workpiece exceeds the predetermined maximum limit for adjusting said stop mechanism to compensate for tool wear, and means actuated by said stop mechanism after a predetermined maximum adjustment for indexing said tool turret to present a succeeding tool to the work engaging position.

5. A lathe comprising a rotary work supporting means, mechanism for loading a workpiece into position for pickup by said work supporting means, a carriage mounted for movement longitudinally of the axis of the work supporting means, a tool slide mounted on the carriage for movement toward and away from the axis of the work supporting means, a cutting tool carried on said slide, means positioned laterally to one side of the axis of the work supporting means for gauging a finished workpiece to determine whether the finished diameter is within predetermined limits of tolerance so as to detect tool wear, said loading mechanism being actuable to deliver the finished workpiece from the rotary work supporting means to the gauging means and means actuated by said gauging means when the diameter of the finished workpiece exceeds the predetermined maximum limit for compensating for tool wear.

6. An automatic lathe comprising a headstock, a rotary work supporting spindle mounted in the headstock, means for driving the spindle, a tailstock, a center mounted in the tailstock for advancement toward the headstock to clamp a workpiece to the spindle, mechanism for loading a workpiece into position for pickup by said center and spindle, means actuated by said loading mechanism to advance said tailstock center when a workpiece is in position, a bed, a carriage mounted on the bed for movement longitudinally of the spindle axis, a tool slide mounted on the carriage for movement toward and away from the spindle axis, adjustable stop means for limiting movement of the slide toward the spindle axis, a tool turret rotatably mounted on the tool slide, a plurality of similar cutting tools equally spaced on the periphery of said turret, said turret being indexible to present successive cutting tools thereon to a work engaging position, means actuated after said tailstock center is advanced for causing said carriage and slide to automatically move the cutting tool in work engaging position through a turning cycle including movement of the slide inwardly toward the spindle axis, movement of the carriage longitudinally of spindle axis through a cutting stroke, return movement of the slide outwardly away from the spindle axis to its starting position, and return movement of the carriage to its starting position, means actuated on movement of the slide toward the spindle axis for starting the spindle driving means, means actuated at the end of the carriage cutting stroke for disabling the spindle driving means, means automatically actuated when said spindle stops rotating to cause withdrawal of the tailstock center to leave the finished workpiece in the loading mechanism, means for gauging a finished workpiece to determine whether the finished diameter is within predetermined limits of tolerance, means automatically actuated when the tailstock center is withdrawn to cause the loading mechanism to unload the finished workpiece and deliver it to the gauging mechanism, means actuated by the finished workpiece in the gauging means for causing said loading mechanism to load another workpiece, means actuated by said gauging means when the diameter of the finished workpiece exceeds the predetermined maximum limit for adjusting said stop means to compensate for tool wear, means actuated by said stop means after a predetermined maximum adjustment for indexing said tool turret to present a succeeding tool to the work engaging position and means controlled by said tool turret after one complete revolution to stop the lathe.

7. An automatic lathe comprising a headstock, a rotary work supporting spindle mounted in the headstock, a tailstock, a center mounted in the tailstock for advancement toward the headstock to clamp a workpiece to the spindle, mechanism for loading a workpiece into position for pickup by said center and spindle, means actuated by said loading mechanism to advance said tailstock center when a workpiece is in position, a bed, a carriage mounted on the bed for movement longitudinally of the spindle axis, a tool slide mounted on the carriage for movement toward and away from the spindle axis, a cutting tool supported on the slide, means actuated after said tailstock center is advanced for causing said carriage and slide to automatically move the cutting tool through a turning cycle including movement of the slide inwardly toward the spindle axis, movement of the carriage longitudinally of spindle axis through a feed stroke, return movement of the slide outwardly away from the spindle axis to its starting position, and return movement of the carriage to its starting position, means actuated on movement of the slide toward the spindle axis for driving said spindle, means actuated at the end of the carriage feed stroke for disabling the spindle driving means, means automatically actuated when said spindle stops rotating to cause withdrawal of the tailstock center to leave the finished workpiece in the loading mechanism, means disposed laterally to one side of the axis of the spindle for gauging a finished workpiece to determine whether the finished diameter is within predetermined limits of tolerance, means automatically actuated when the tailstock center is withdrawn to cause the loading mechanism to unload the finished workpiece and deliver it to the gauging mechanism, means actuated by the finished workpiece in the gauging means for causing said loading mechanism to load another workpiece, means actuated by said gauging means when the diameter of the finished workpiece exceeds the predetermined maximum limit for compensating for tool wear, and means actuated by said gauging means when the finished diameter is less than the predetermined minimum limit for stopping the lathe, the automatic operation of the lathe being unaffected when the finished diameter is within predetermined limits.

8. An automatic lathe comprising a headstock, a rotary work supporting spindle mounted in the headstock, means for driving the spindle, a tailstock, a center mounted in the tailstock for movement toward the headstock to clamp a workpiece to the spindle, mechanism for loading a workpiece into position for pickup by said center and spindle, means actuated by said loading mechanism to advance said tailstock center when a workpiece is in position, a bed, a carriage mounted on the bed for movement longitudinally of the spindle axis, a tool slide mounted on the carriage for movement toward and away from the spindle axis, a cutting tool supported on the slide, means actuated by said tailstock center in advanced position for controlling said carriage and slide to automatically move the cutting tool through a turning cycle including movement of the slide inwardly toward the spindle axis, movement of the carriage longitudinally of spindle axis through a cutting stroke, return movement of the slide outwardly away from the spindle axis to its starting position, and return movement of the carriage to its starting position, means actuated at the end of the carriage cutting stroke for disabling the spindle driving means, means automatically actuated when said spindle stops rotating to cause withdrawal of the tailstock center to leave the finished workpiece in the loading mechanism, means for gauging a finished workpiece to determine whether the finished diameter is within predetermined limits of tolerance, means automatically actuated when the tailstock center is withdrawn to cause the loading mechanism to unload the finished workpiece and deliver it to the gauging mechanism, means actuated by the finished workpiece in the gauging means for causing said loading mechanism to load another workpiece, means for compensating for tool wear, actuated by said gauging means when the diameter of the finished workpiece exceeds the predetermined maximum tolerable limit by no more than a predetermined compensable amount, and means for stopping the lathe, actuated by said gauging means when the finished diameter exceeds the predetermined maximum tolerable limit by more than the predetermined compensable amount, the automatic operation of the lathe being unaffected when the finished diameter is within predetermined limits.

9. An automatic lathe comprising a headstock, a rotary work supporting spindle mounted in the headstock, means for driving the spindle, a tailstock, a center mounted in the tailstock for movement toward the headstock to clamp a workpiece to the spindle, mechanism for loading a workpiece into position for pickup by said center and spindle, means actuated by said loading mechanism to advance said tailstock center when a workpiece is in position, a bed, a carriage mounted on the bed for movement longitudinally of the spindle axis, a tool slide mounted on the carriage for movement toward and away from the spindle axis, a cutting tool supported on the slide, means actuated by said tailstock center in advanced position for starting the spindle drive and for controlling said carriage and slide to automatically move the cutting tool through a turning cycle including movement of the slide inwardly toward the spindle axis, movement of the carriage longitudinally of spindle axis through a feed stroke, return movement of the slide outwardly away from the spindle axis to its starting position, and return movement of the carriage to its starting position, means actuated at the end of the carriage feed stroke for disabling the spindle driving means, means automatically actuated when said spindle stops rotating to cause withdrawal of the tailstock center to leave the finished workpiece in the loading mechanism, means disposed laterally to one side of the spindle axis for gauging a finished workpiece to determine whether the finished diameter is within predetermined limits of tolerance, means automatically actuated when the tailstock center is withdrawn to cause the loading mechanism to unload the finished workpiece and deliver it to the gauging means, means responsive to the presence of a finished workpiece in the gauging for causing the loading mechanism to load another workpiece, and means responsive to said gauging means when the diameter of a finished workpiece exceeds said tolerable limit to compensate for tool wear.

10. A lathe, comprising, rotary work supporting means, a carriage mounted for movement longitudinally of the axis of the work supporting means, a tool slide mounted on the carriage for movement toward and away from the axis of the work supporting means, a cutting tool carried on the slide, adjustable stop means for limiting movement of the slide toward the axis of the work supporting means including an indexable disc having a group of circumferentially arranged stepped stops projecting axially of the disc, successive stops of which group project successively shorter distances toward the tool slide to limit movement of the slide, means for gauging a machined workpiece to determine whether the finished diameter exceeds a predetermined tolerable limit to detect tool wear, and means controlled by the gauging means for indexing the disc when the diameter of the workpiece gauged exceeds said limit to compensate for tool wear.

11. A lathe, comprising, rotary work supporting means, a tool slide mounted for movement longitudinally of the axis of the work supporting means and for movement toward and away from the axis of the work supporting means, a tool supporting turret rotatably mounted on the slide, a plurality of like cutting tools mounted on the periphery of the turret, means mounting the turret for indexing to present successive tools to a work engaging position, adjustable stop means for limiting movement of the slide toward the axis of the work supporting means including an indexable disc having a group of circumferentially arranged stepped stops projecting axially of the disc, successive stops of which group project successively shorter distances toward the tool slide to limit movement of the slide, means for gauging a machined workpiece to determine whether the finished diameter exceeds a predetermined tolerable limit to detect tool wear, means controlled by the gauging means for indexing the disc when the diameter of the workpiece gauged exceeds said limit to compensate for tool wear, and means actuated by the disc after a predetermined maximum adjustment for indexing the turret to present a succeeding tool to the work engaging position.

12. In an automatic lathe, in combination, rotary work supporting means, a tool support mounted for movement longitudinally and transversely of the axis of the rotary work supporting means, a tool turret indexable rotatably on the tool support, a plurality of like cutting tools mounted on the periphery of the turret, means for indexing the turret to present successive tools to a work engaging position, means for detenting the turret in its successive positions including a disc having peripherally spaced recesses and a detent plunger mounted for movement into and out of the recesses, means for moving the detent plunger, means for automatically effecting movement of the tool support through a work cycle for machining a workpiece held by the work supporting means, means for automatically gauging a machined workpiece to determine whether the finished diameter exceeds a predetermined tolerable limit to detect tool wear, and means controlled by the gauging means for effecting withdrawal of the detent plunger and indexing of the turret when the diameter of the workpiece gauged exceeds said limit, the last of the recesses formed in said disc for receiving said plunger having an increased depth relative to the other recesses so as to permit an increased movement of the detent plunger on engagement with said last recess, and means actuated on the increased movement of the plunger for terminating automatic operation of the lathe.

13. A lathe, comprising, rotary work supporting means, a tool slide mounted for movement relative to the work supporting means, a tool turret indexable rotatably on the tool slide, a plurality of similar cutting tools circumferentially spaced on the turret, means for indexing the turret to present successive tools to work engaging position, means for gauging a machined workpiece to determine whether the finished diameter exceeds a predetermined tolerable limit to detect tool wear, and means controlled by the gauging means for actuating said indexing means to present a succeeding tool to work engaging position when the diameter of the workpiece gauged exceeds said limit.

14. A lathe, comprising, rotary work supporting means, a stool slide mounted for movement longitudinally and transversely of the axis of the work supporting means, a tool supporting turret, a plurality of similar cutting tools mounted on the turret, means movably mounting the turret on the slide for indexing to present successive tools to a work engaging position, adjustable stop means for regulating the movement of the slide toward the axis of the work supporting means, means disposed laterally to one side of the axis of the work supporting means for gauging the machined portion of a workpiece to determine whether the finished diameter exceeds a predetermined tolerable limit thereby to detect tool wear, means for delivering a workpiece from the work supporting means to the gauging means, means controlled by the gauging means for adjusting said stop means when the diameter of the workpiece gauged exceeds said limit to compensate for tool wear, and means actuated by said stop means after a predetermined adjustment for indexing the turret to present a succeeding tool to work engaging position.

15. A lathe, comprising a tool slide mounted for movement toward and away from the axis of the work, a tool supporting turret, a plurality of similar cutting tools mounted on the turret, means movably mounting the turret on the slide for indexing to present successive tools to a work engaging position, adjustable control means for regulating the movement of the slide toward the axis of the work, means for gauging the machined portion of a workpiece to determine whether the finished diameter exceeds a predetermined tolerable limit to detect tool wear, means controlled by the gauging means for adjusting said control means when the diameter of the workpiece gauged exceeds said limit to compensate for tool wear and means actuated by a predetermined adjustment of said control means for indexing the turret to present a succeeding tool to work engaging position.

16. A lathe, comprising, a rotary work support, a tool slide movable longitudinally of and transversely of the axis of the work support, adjustable stop means for limiting movement of the slide toward the axis of the work support means disposed laterally to one side of the axis of the work support for gauging a machined portion of a workpiece to determine whether the finished diameter exceeds a predetermined tolerable limit thereby to detect tool wear, means for delivering a workpiece from the work support to the gauging means, and means controlled by the gauging means for adjusting said stop means when the finished diameter exceeds said limit to compensate for tool wear.

17. A lathe, comprising, a rotary work support, a tool slide movable longitudinally and transversely relative to the axis of the work support, a tool supporting turret, a plurality of similar cutting tools mounted on the turret, means movably mounting the turret on the slide for indexing to present successive tools to a work engaging position, means disposed laterally to one side of the axis of the work support for gauging a machined portion of a workpiece to determine whether the finished diameter exceeds a predetermined tolerable limit thereby to detect tool wear, means for delivering a workpiece from the work support to the gauging means, and means controlled by the gauging means for indexing said turret to present a succeeding tool to work engaging position when the finished diameter exceeds said limit.

(References on following page)

References Cited in the file of this patent

UNITED STATES PATENTS

| | | |
|---|---|---|
| 945,947 | Hendrickson | Jan. 11, 1910 |
| 1,564,216 | Doane | Dec. 8, 1925 |
| 1,840,841 | Highberg | Jan. 12, 1932 |
| 1,841,988 | Smith et al. | Jan. 19, 1932 |
| 1,871,752 | Simonds | Aug. 16, 1932 |
| 1,872,667 | Bryant | Aug. 23, 1932 |
| 2,002,705 | Moller | May 28, 1935 |
| 2,033,677 | Bergstrom | Mar. 10, 1936 |
| 2,042,257 | Harrison et al. | May 26, 1936 |
| 2,364,804 | Montgomery | Dec. 12, 1944 |
| 2,372,427 | Johnson | Mar. 27, 1945 |
| 2,386,432 | Bullock | Oct. 9, 1945 |
| 2,473,108 | Meyer | June 14, 1949 |
| 2,501,130 | Kuppersmith | Mar. 21, 1950 |
| 2,505,684 | McClernon | Apr. 25, 1950 |
| 2,612,995 | Kahle et al. | Oct. 7, 1952 |
| 2,632,956 | Crosby | Mar. 31, 1953 |
| 2,641,151 | Lee | June 9, 1953 |
| 2,714,324 | Dinsmore | Aug. 2, 1955 |
| 2,718,100 | Hjarpe | Sept. 20, 1955 |
| 2,720,129 | De Haas | Oct. 11, 1955 |
| 2,739,717 | Dinsmore | Mar. 27, 1956 |
| 2,831,387 | Ovshinsky | Apr. 22, 1958 |
| 2,897,638 | Maker | Aug. 8, 1959 |

FOREIGN PATENTS

| | | |
|---|---|---|
| 490,522 | Canada | Feb. 10, 1953 |

OTHER REFERENCES

"Sheffield Automation Systems and Equipment," Catalog No. AU–1154, The Sheffield Corporation, Dayton 1, Ohio, © 1954, 12 pages, p. 7.

American Machinist, October 24, 1955, pages 121–125.